(12) United States Patent
Murata et al.

(10) Patent No.: US 8,284,359 B2
(45) Date of Patent: Oct. 9, 2012

(54) LIQUID CRYSTAL PANEL AND LIQUID CRYSTAL DISPLAY DEVICE

(75) Inventors: Mitsuhiro Murata, Osaka (JP); Shoichi Ishihara, Osaka (JP); Shuichi Kozaki, Osaka (JP); Takehisa Sakurai, Osaka (JP); Tadashi Ohtake, Osaka (JP); Masako Nakamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 146 days.

(21) Appl. No.: 12/995,541

(22) PCT Filed: Mar. 17, 2010

(86) PCT No.: PCT/JP2010/001908
§ 371 (c)(1),
(2), (4) Date: Dec. 1, 2010

(87) PCT Pub. No.: WO2011/013269
PCT Pub. Date: Feb. 3, 2011

(65) Prior Publication Data
US 2011/0199570 A1    Aug. 18, 2011

(30) Foreign Application Priority Data
Jul. 31, 2009 (JP) .................. 2009-179441

(51) Int. Cl.
G02F 1/1337 (2006.01)
(52) U.S. Cl. .............. 349/123; 349/130; 345/173
(58) Field of Classification Search .......... 349/123–132, 349/138; 345/173
See application file for complete search history.

(56) References Cited

U.S. PATENT DOCUMENTS

| | | | |
|---|---|---|---|
| 5,305,127 A | 4/1994 | Konuma | |
| 5,490,001 A | 2/1996 | Konuma | |
| 5,539,545 A | 7/1996 | Shimizu et al. | |
| 5,546,208 A | 8/1996 | Shimizu et al. | |
| 5,574,581 A | 11/1996 | Shimizu et al. | |
| 5,680,189 A | 10/1997 | Shimizu et al. | |
| 5,682,218 A | 10/1997 | Shimizu et al. | |
| 5,739,882 A | 4/1998 | Shimizu et al. | |
| 6,927,827 B2 * | 8/2005 | Jung et al. | 349/138 |
| 2004/0066480 A1 | 4/2004 | Yoshida et al. | |
| 2005/0270472 A1 | 12/2005 | Yamada et al. | |

FOREIGN PATENT DOCUMENTS

| | | |
|---|---|---|
| JP | 8-320470 | 12/1996 |
| JP | 11-287983 | 10/1999 |
| JP | 2000-098410 | 4/2000 |
| JP | 2001-159759 | 6/2001 |
| JP | 2006-018238 | 1/2006 |

* cited by examiner

Primary Examiner — Brian M. Healy
Assistant Examiner — Mary El Shammaa
(74) Attorney, Agent, or Firm — Nixon & Vanderhye, P.C.

(57) ABSTRACT

A liquid crystal panel (2) includes a pair of substrates (10, 20) and a liquid crystal layer (30) sandwiched between the substrates (10, 20). At least one of the substrate (10, 20) is provided with combtooth electrodes (12, 13). The liquid crystal layer (30) is driven by a transverse electric field generated between the combtooth electrodes (12, 13). The liquid crystal layer (30) contains liquid crystal molecules (31) that align themselves perpendicularly to surfaces of the substrates when no electric field is applied. The liquid crystal panel 2 satisfies $0.33 \leq S/(S+L) \leq 0.64$, where L is the width of each of the combtooth electrodes (12, 13) and S is the electrode interval.

8 Claims, 21 Drawing Sheets

F I G. 4
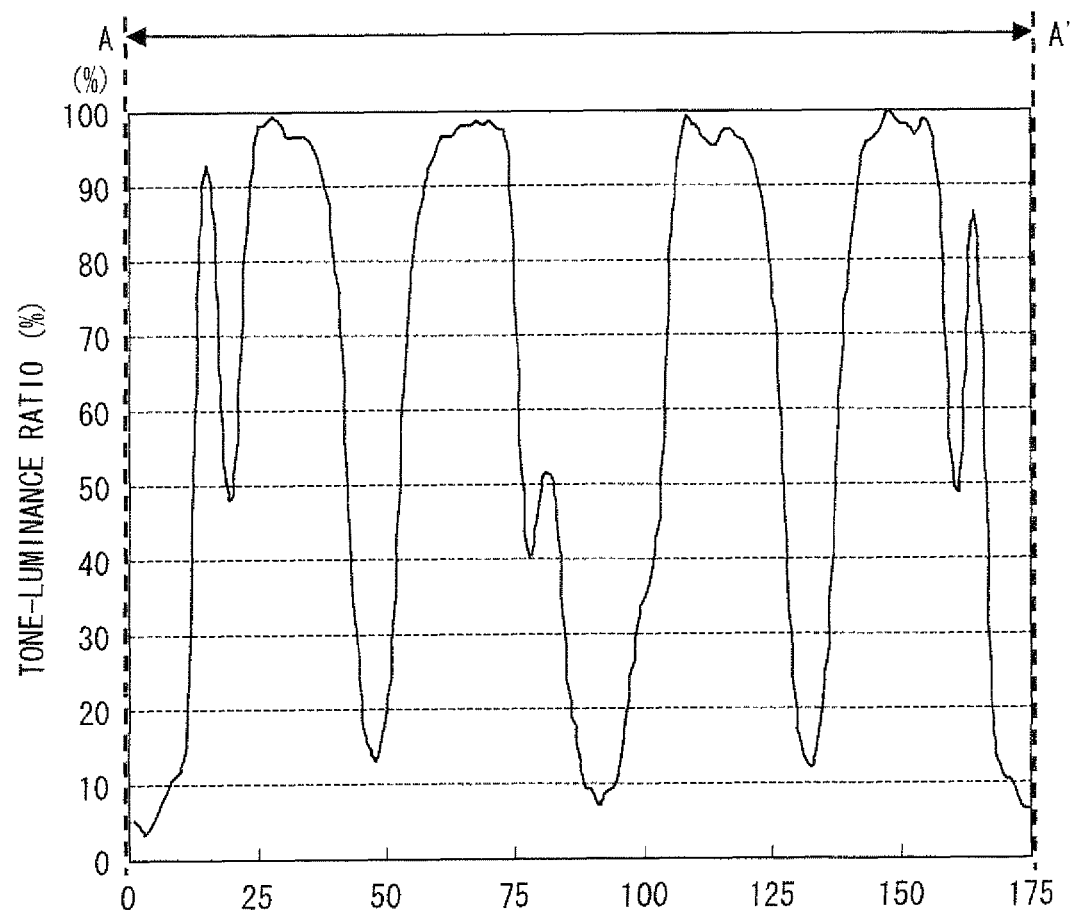

F I G. 16
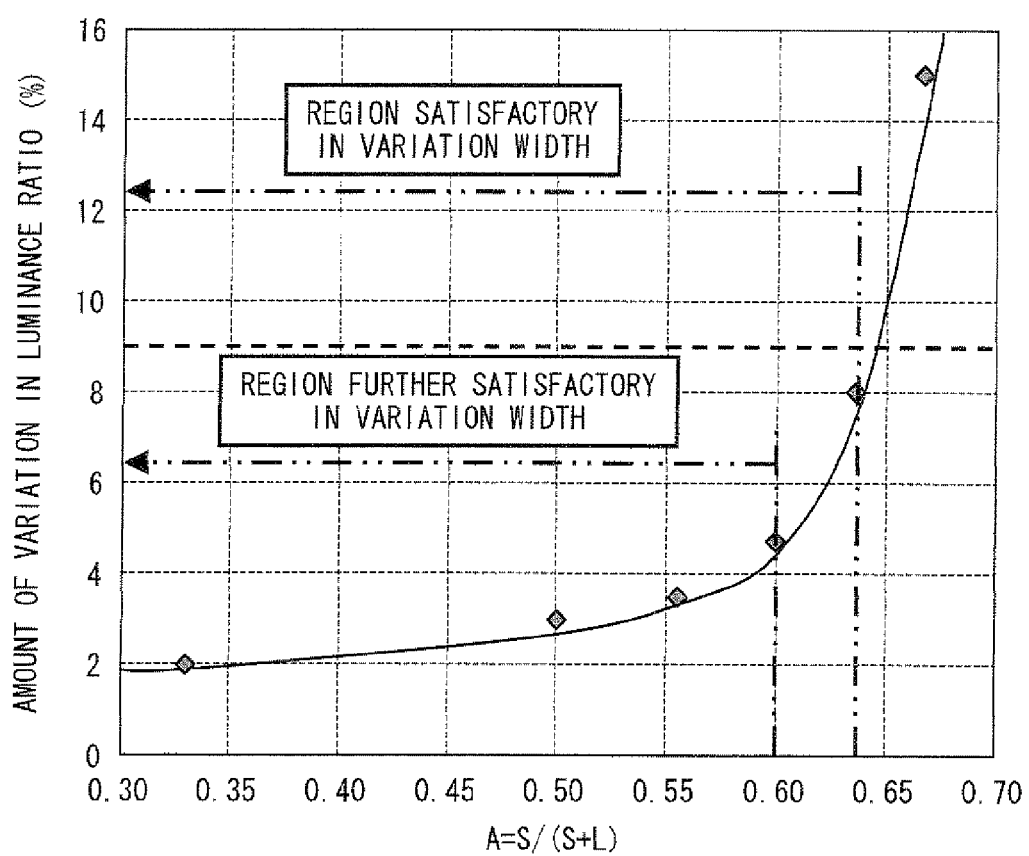

F I G. 1 7
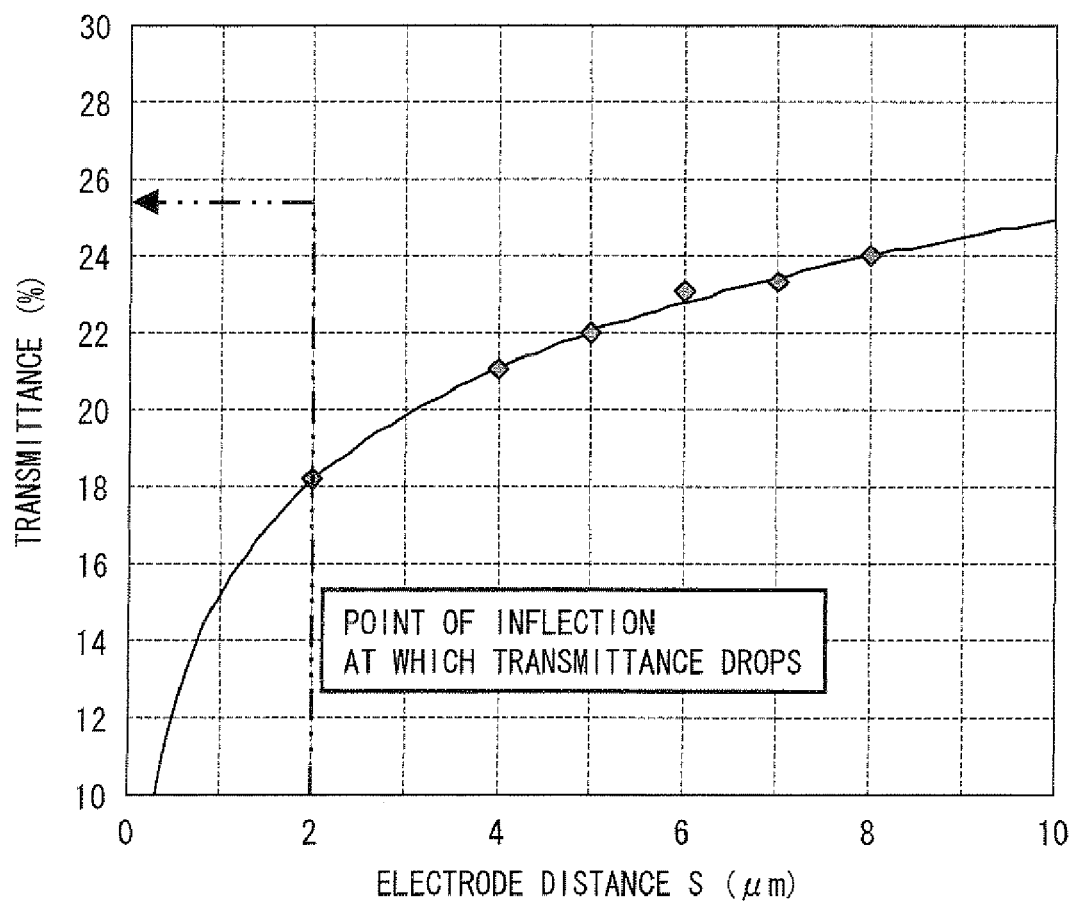

F I G. 2 2
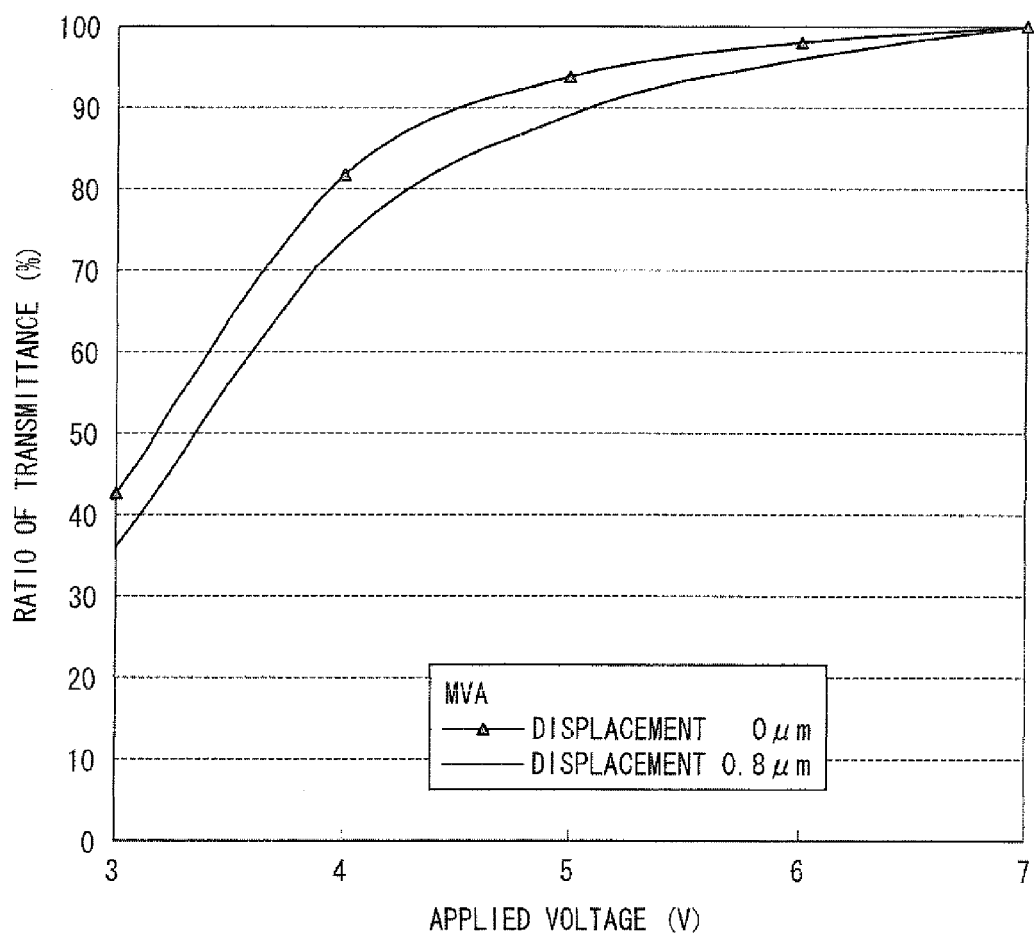

LIQUID CRYSTAL PANEL AND LIQUID CRYSTAL DISPLAY DEVICE

This application is the U.S. national phase of International Application No. PCT/JP2010/001908 filed 17 Mar. 2010, which designated the U.S. and claims priority to JP Application No. 2009-179941 filed 31 Jul. 2009, the entire contents of each of which are hereby incorporated by reference.

TECHNICAL FIELD

The present invention relates to liquid crystal panels and liquid crystal display devices and, more particularly, to a vertical alignment liquid crystal panel that is driven by a transverse electric field so that transmission of light is controlled and a liquid crystal display device including such a liquid crystal panel.

BACKGROUND ART

Liquid crystal display devices, having low-profile, lightweight, low-power-consumption features, have been widely used in various fields such as banking terminals such as ATMs (automated teller machines), personal computers, remote controllers, and various monitors. Especially, in recent years, thanks to their features above, liquid crystal display devices have been especially suitably used for mobile applications such as electronic organizers, PDAs (personal digital assistants), and cellular phones.

In most cases of such applications, various operations are carried out by: placing a touch panel as a coordinate input device on a liquid crystal panel in a liquid crystal display device; and inputting coordinates pointed at by either pressing a surface of the touch panel with a finger directly touching the surface or pressing the surface with a touch pen or the like. A liquid crystal display device is also known whose liquid crystal panel has a coordinate input function instead of having a touch panel placed thereon.

In such liquid crystal display devices or, in particular, in a liquid crystal display device that is used for mobile applications, a vertical alignment liquid crystal panel referred to, for example, as the VA (vertical alignment) mode is suitably used because of its higher contrast than any other display modes. Among them, a vertical alignment liquid crystal panel referred to as the MVA (multi-domain vertical alignment) mode, in which the tilt direction of liquid crystal molecules in the presence of an electric field is divided into a plurality of directions by providing slits in pixel electrodes on an active matrix substrate and providing protrusions (ribs) as part of counter electrodes on a counter substrate, is especially suitably used because of its wide viewing angle.

However, such a liquid crystal display device suffers from pressure unevenness in display (white unevenness) when its touch panel is pressed with a touch pen or the like.

Application of pressure force to a surface of the touch panel with a touch pen or the like causes a slight change in cell thickness of the area subjected to the pressure force.

Conventionally, various improvements have been suggested to reduce cell thickness variation, for example, by placing a large number of columnar spacers.

For example, Patent Literature 1 discloses a technique by which in a bending-prone liquid crystal electro-optic device such as a 40-inch class of large-screen television, a pair of translucent substrates that form a liquid crystal cell are bonded together by curing a resin material to form resin spacers between the translucent substrates as means for preventing cell thickness variation from being caused when the liquid crystal panel is propped up.

According to Patent Literature 1, first, a mixture containing a liquid crystal material, a resin material, and an initiating reagent is heated until the liquid crystals exhibit an isotropic phase and sandwiched between a pair of translucent substrates kept at a constant interval by bead spacers. After that, by gradually lowering the temperature to separate out the resin material contained in the mixture, the liquid crystal material and the resin material were separated from each other. Next, by irradiating the mixture with ultraviolet rays to cleave the initiating agent and cure the resin material, resin spacers are formed between the translucent substrates.

Further, Patent Literature 2 discloses a technique for, in order to suppress the flowage of liquid crystals due to pressure, forming columnar spacers, having an average diameter of 2 to 50 μm, whose surfaces make contact with both the electrode substrate and the counter substrate.

According to Patent Literature 2, first, a coating liquid obtained by dissolving or dispersing a liquid crystal material, bead spacers, and a non-liquid-crystal polymer in or into a solvent is applied to the electrode substrate. Next, by producing an increase in temperature after evaporating the solvent and putting the counter substrate above the electrode substrate, islands of a cured product of the non-liquid-crystal polymer are grown and cured to be columns supporting both the substrates. Thus, columnar spacers are formed whose surfaces make contact with both the substrates.

Patent Literature 3 discloses a technique for, in order to suppress such problems that a low arrangement density of columnar spacers results in a lack of strength to cause unevenness of cell gap due to pressure and that the liquid crystal material is unevenly distributed by gravitation generated when the liquid crystal panel is propped up, controlling cell thickness by setting the spring constant of columnar spacers per unit area within a predetermined range.

CITATION LIST

Patent Literature 1
Japanese Patent Application Publication, Tokukaihei, No. 11-287983 (Publication Date: Oct. 19, 1999)
Patent Literature 2
Japanese Patent Application Publication, Tokukaihei, No. 8-320470 (Publication Date: Dec. 3, 1996)
Patent Literature 3
Japanese Patent Application Publication, Tokukai, No. 2006-18238 (Publication Date: Jan. 19, 2006)

SUMMARY OF INVENTION

Technical Problem

However, Patent Literatures 1 to 3 merely suppress cell thickness variation by using bead spacers or columnar spacers as described above. That is, Patent Literatures 1 to 3 are intended to suppress cell thickness variation per se, but are not intended to suppress pressure unevenness (white unevenness) with the substrate(s) displaced (i.e., with the cell thickness varied), neither has such a technique been known yet.

Furthermore, the techniques of Patent Literatures 1 to 3 are less effective in suppressing pressure unevenness caused by cell thickness variation due to distortion (undulation) of a substrate such as a glass substrate as caused by the pressure force of the tip of a pen such as a touch pen.

The present invention has been made in view of the foregoing problems, and it is an object of the present invention to remedy pressure unevenness caused by cell thickness variation due to distortion (undulation) of a substrate.

Solution to Problem

In order to solve the foregoing problems, a liquid crystal panel according to the present invention includes: a pair of substrates; and a liquid crystal layer sandwiched between the substrates, at least one of the substrates being provided with a first electrode and a second electrode, the liquid crystal layer being driven by a transverse electric field generated between the first and second electrodes, the liquid crystal layer containing liquid crystal molecules that align themselves perpendicularly to surfaces of the substrates when no electric field is applied, the liquid crystal panel satisfying $0.33 \leq S/(S+L) \leq 0.64$, where L is the width of each of the first and second electrodes and S is the interval between the first and second electrodes.

Further, in order to solve the foregoing problems, a liquid crystal panel according to the present invention includes: a pair of substrates; and a liquid crystal layer sandwiched between the substrates, at least one of the substrates being provided with a first electrode and a second electrode, the liquid crystal layer being driven by a transverse electric field generated between the first and second electrodes, the liquid crystal layer containing liquid crystal molecules that align themselves perpendicularly to surfaces of the substrates when no electric field is applied, the liquid crystal panel having a rate of occupation by dead zones of 24% or higher and 35% or lower, the rate of occupation by dead zones being the proportion of portions whose respective tone-luminance ratios are 20% or lower to the total number of places into which a unit region has been divided equally along an X axis, obtained by normalizing the respective luminances of the places into which the unit region has been divided equally along the X axis.

Each of the foregoing configurations can render curves of distribution of transmittance along a direction parallel to surfaces of the substrates smaller to suppress a difference in transmittance between a portion with cell thickness variation and a portion without cell thickness variation. For this reason, pressure unevenness caused by cell thickness variation can be better remedied than ever before.

Further, a liquid crystal display device according to the present invention includes such a liquid crystal panel according to the present invention.

The foregoing configuration makes it possible to provide a liquid crystal display device capable of better remedying pressure unevenness caused by cell thickness variation than ever before.

Advantageous Effects of Invention

As described above, a liquid crystal panel according to the present invention and a liquid crystal panel including such a liquid crystal panel are of a vertical alignment type and, by driving the liquid crystal layer by a transverse electric field and setting S/(S+L) or the rate of occupation by dead zones within a specific range, curves of distribution of transmittance along a direction parallel to surfaces of the substrates are rendered smaller so that a difference in transmittance between a portion with cell thickness variation and a portion without cell thickness variation can be suppressed. For this reason, pressure unevenness caused by cell thickness variation can be better remedied than ever before.

BRIEF DESCRIPTION OF DRAWINGS

FIG. 4 is a graph showing a relationship between positions along the X axis and tone-luminance ratios as observed when the region A-A' is divided into 255 tones by image processing and a luminance portion corresponding to the highest luminance among the 255 tones is normalized as 100%.

FIG. 16 is a graph showing a relationship between the value of A expressed as A=S/(S+L) and the amount of change in luminance ratio as obtained when the amount of displacement of a substrate is 0.8 μm.

FIG. 17 is a graph showing a relationship between the transmittance as obtained when a voltage of 7 V is applied to each of the liquid crystal panels (1) to (6) and the electrode interval S.

FIG. 22 is a graph showing a relationship between the voltage applied and the ratio of transmittance by pressure in the liquid crystal panel of FIG. 21.

DESCRIPTION OF EMBODIMENTS

The inventors studied diligently to remedy pressure unevenness caused by cell thickness variation due to distortion (undulation) of a substrate such as a glass substrate.

As a result, the inventors found that pressure unevenness caused by cell thickness variation is effectively remedied when a liquid crystal layer sandwiched between a pair of substrates finished with vertical alignment treatment is driven by a so-called transverse electric field parallel to surfaces of the substrates.

Further, the inventors found that in a liquid crystal panel of such a drive system (display system), a change in transmittance can be suppressed by rendering curves of distribution of transmittance along a direction parallel to surfaces of the substrates smaller to reduce a difference in transmittance distribution between a portion with cell thickness displacement and a portion without cell thickness displacement.

The present invention is described below in detail with reference to FIG. 1 through (a) and (b) of FIG. 23.

Figure 2:
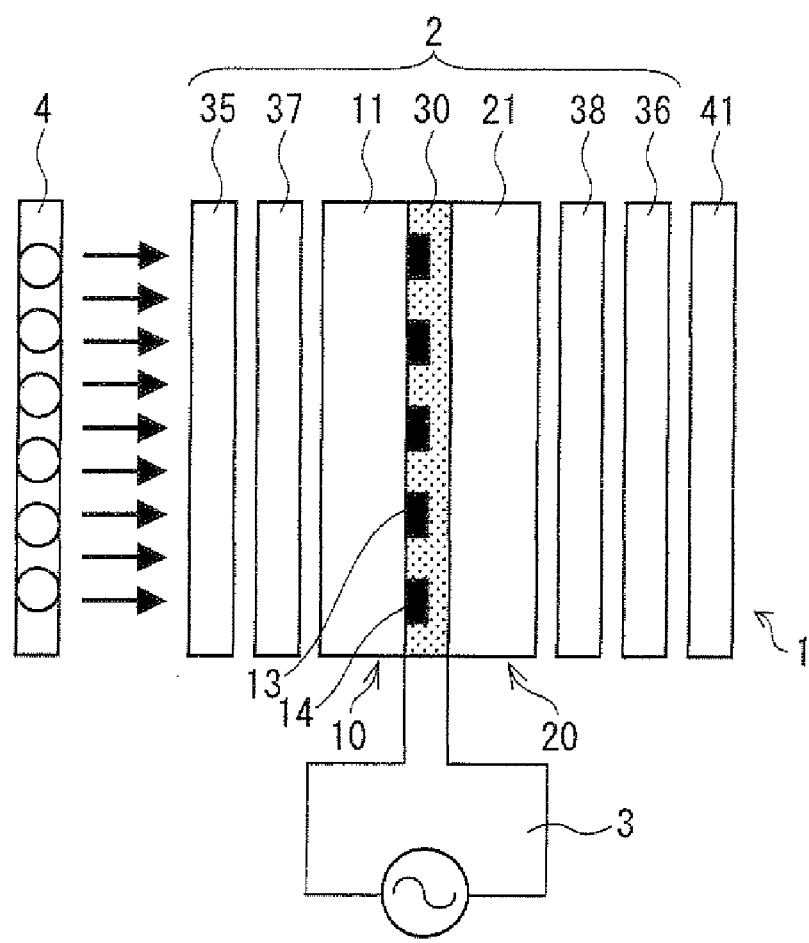
FIG. 2 is an exploded cross-sectional view schematically showing the configuration of a liquid crystal display device according to an embodiment of the present invention.

First, the configurations of a liquid crystal panel according to the present embodiment and a liquid crystal display device including such a liquid crystal panel are schematically described. FIG. 2 is an exploded cross-sectional view schematically showing the configuration of a liquid crystal display device according to the present embodiment.

As shown in FIG. 2, a liquid crystal display device 1 according to the present embodiment includes a liquid crystal panel 2, a driving circuit 3, and a backlight 4 (illumination device). Further, for example, the liquid crystal panel 2 has a touch panel 41 provided thereon as needed. The driving circuit 3, the backlight 4, and the touch panel are identical in configuration to their conventional counterparts. Therefore, these components are not described below.

Figure 1:
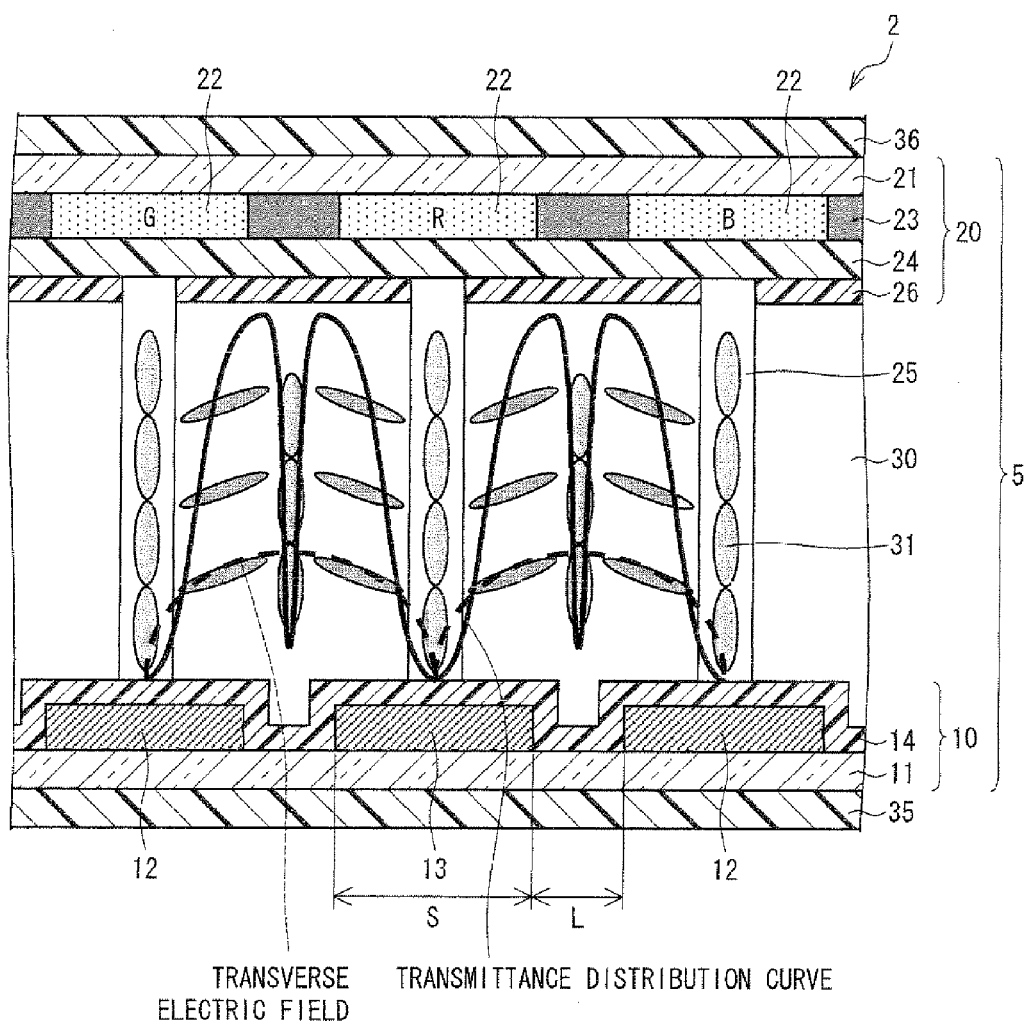
FIG. 1 is a cross-sectional view schematically showing the configuration of a main part of a liquid crystal panel according to an embodiment of the present invention.

FIG. 1 is a cross-sectional view schematically showing the configuration of a main part of the liquid crystal panel 2. It should be noted that FIG. 1 schematically shows the configuration of a main part of the liquid crystal panel 2 with a voltage applied thereto.

As shown in FIGS. 1 and 2, the liquid crystal panel 2 according to the present embodiment includes: a pair of substrates 10 and 20, provided to face each other, which serve as an electrode substrate (array substrate) and a counter electrode, respectively; and a liquid crystal layer 30, sandwiched between the substrates 10 and 20, which serves as a display medium layer. It should be noted that in order to give desired properties, the liquid crystal layer 30 may contain various additives other than a liquid crystal material within such a range that a display is not inhibited.

At least that one of the substrates 10 and 20 which faces an observer includes a transparent substrate, such as a glass substrate, which serves as an insulating substrate. It should be noted that the description below assumes that that one of the substrates which serves as a display surface (that one of the substrates which faces the observer) is an upper substrate and the other substrate is a lower substrate.

Further, the substrates 10 and 20 are finished with vertical alignment treatment. The substrates 10 and 20 may be provided with vertical alignment control films (referred to as "vertical alignment films") as vertical alignment treatment or finished with vertical alignment treatment by exposure to ultraviolet radiation or the like. In the present embodiment, provided as that surface of the substrate 10 which faces the substrate 20 is a vertical alignment film serving as an alignment film 14, and provided as that surface of the substrate 20 which faces the substrate 10 is a vertical alignment film serving as an alignment film 26.

The vertical alignment films are alignment films that cause liquid crystal molecules of a liquid crystal layer to align themselves perpendicularly to surfaces of substrates when no electric field is applied. Such vertical alignment films can be formed, for example, by applying onto the surfaces of the substrates 10 and 20 a publicly-known alignment film material having vertical alignment controlling force. It should be noted that the term "perpendicularly" encompasses "substantially perpendicularly".

An example of the substrate 10 (first substrate, electrode substrate) is an array substrate such as a TFT array substrate, and an example of the substrate 20 (second substrate, counter substrate) is a color filter substrate or the like.

Further, at least one of the substrates 10 and 20 includes electric field applying means for applying to the liquid crystal layer 30 an electric field (referred to as "transverse electric field") parallel to the surfaces of the substrates. FIGS. 1 and 2 show a configuration in which one of the substrates 10 and 20, namely the substrate 10, is provided with combtooth electrodes 12 and 13 serving as such electric field applying means. It should be noted that the term "parallel" encompasses "substantially parallel".

First, the substrate 10 is described below in detail.

The substrate 10 is configured to have combtooth electrodes 12 and 13 and an alignment film 14 provided in this order, for example, on a glass substrate 11. The alignment film 14 is provided on the glass substrate 11 in such a way as to cover the combtooth electrodes 12 and 13.

In the liquid crystal panel 2, a display is carried out by supplying a potential difference into the space between combtooth electrodes 12 and 13 paired with each other. This potential difference causes a transverse electric field to be generated between the combtooth electrodes 12 and 13 as shown in FIG. 1, and the transverse electric field causes a change in alignment of liquid crystal molecules 31, thus causing a change in transmittance.

That is, one of the combtooth electrodes 12 and 13 adjacent to each other, namely the combtooth electrode 12 (first electrode), is a common electrode which is mainly at 0 V. On the other hand, the other combtooth electrode 13 (second electrode) is a pixel electrode, connected to a signal line and a switching element such as a TFT via a drain electrode (not shown), to which a signal corresponding to a video signal is applied.

The combtooth electrodes 12 and 13 may be made of a transparent electrode material such as ITO (indium tin oxide) or IZO (indium zinc oxide) or made of a metal such as aluminum. There is no particular limitation on the material for the combtooth electrodes 12 and 13.

These combtooth electrodes 12 and 13 can be formed by employing vacuum evaporation, plasma chemical vapor deposition, or the like, as well as sputtering, to form a conducting layer from which these combtooth electrodes 12 and 13 are formed and then employing photolithography or the like to pattern the conducting layer.

Next, the substrate 20 is described.

The substrate 20 is configured to have color filters 22 of different colors, a black matrix 23, a planarizing film 24 (overcoat layer), and an alignment film 26 provided in this order, for example, on a glass substrate 21. Although FIG. 1 illustrates an example where the color filters 22 of different colors are R (red), G (green), and B (blue) color filters 22, the present embodiment is not limited to this. Further, there is no particular limitation on the order or arrangement of the color filters 22 of different colors.

Further, provided on the planarizing film 24 are columnar spacers 25 serving as spacers for maintaining a constant distance between the substrates 10 and 20.

The planarizing film 24 is provided so as to planarize that surface of the glass substrate 21 on which the color filters 22 and the black matrix 23 are provided.

The columnar spacers 25 may be formed on the planarizing film 24 as shown in FIG. 1 or formed inside of the planarizing film 24, i.e., integrally with the planarizing film 24.

That is, the columnar spacers 25 may be provided on the planarizing film 24 by forming the planarizing film 24 and then forming photospacers. Alternatively, for example, after a material for a planarizing film is applied by spin coating so that the planarizing film is thick, the columnar spacers 25 may be formed by using half exposure, while the planarizing film 24 may be allowed to remain intact.

Further, the columnar spacers 25 may be provided on the side of the substrate 10 or formed on the alignment film 14 or the alignment film 26.

Examples of the planarizing film material include, but are not particularly limited to, conventional publicly known planarizing film materials such as: organic insulating films such as those made of acrylic resin; and inorganic insulating films such as those made of TEOS (ethyl orthosilicate; $Si(OC_2H_5)_4$) and those made of SOG (spin-on glass).

Further, in the present embodiment, there is no particular limitation on the thickness of each layer in the substrate 10 or 20.

Further, as shown in FIGS. 1 and 2, the surface of the substrate 10 opposite that surface of the substrate 10 which faces the liquid crystal layer 30 is provided with a polarizing plate 35, and the surface of the substrate 20 opposite that surface of the substrate 20 which faces the liquid crystal layer 30 is provided with a polarizing plate 36.

Further, there may be provided wave plates 37 and 38 as needed, as shown in FIG. 2, between the substrate 10 and the polarizing plate 35 and between the substrate 20 and the polarizing plate 36, respectively. Alternatively, the wave plate 37 or 38 may be provided in only one surface of the liquid crystal panel 2. Further, in the case of use of frontal transmitted light only, the wave plates 37 and 38 are not necessarily essential.

The liquid crystal panel 2 has a liquid crystal cell 5 formed by joining the substrates 10 and 20 with a sealing agent (not shown) with spacers (not shown) interposed therebetween and sealing a liquid crystal material (or a medium containing a liquid crystal material) in the space between the substrates 10 and 20.

The liquid crystal material can be either a p-type (positive) liquid crystal material whose liquid crystal molecules 31 have positive dielectric anisotropy $\Delta\varepsilon$ or an n-type (negative) liquid crystal material whose liquid crystal molecules 31 have negative dielectric anisotropy $\Delta\varepsilon$. A specific example of the p-type liquid crystal material is a nematic liquid crystal material, and a specific example of the n-type liquid crystal material is a banana-type liquid crystal material. Although the present embodiment is described by taking as an example a case where a p-type liquid crystal material is used, the only difference between a case where a p-type liquid crystal material is used and a case where an n-type liquid crystal material is used is a difference in bend arrangement (bend alignment), and the present invention is in no way limited thereby.

The liquid crystal panel 2 is formed by joining the wave plates 37 and 38 and the polarizing plates 35 and 36 to the liquid crystal cell 5 as described above.

The polarizing plates 35 and 36 are joined so that their transmission axes are oriented orthogonally to each other and form 45 degrees with the direction in which an electric field is applied. Specifically, the polarizing plates 35 and 36 are joined so that their transmission axes are orthogonal and form an angle of 45° with the direction along which the combtooth electrodes 12 and 13 extend.

Next, the display system (vertical-alignment transverse-electric-field mode) of the liquid crystal panel 2 is described below with reference to FIG. 1.

As mentioned above, the first point to remedy pressure unevenness caused by cell thickness variation due to distortion (undulation) of the substrates (or, in particular, the upper substrate 20) lies in the display system of the liquid crystal panel 2.

As mentioned above, the liquid crystal panel 2 is configured such that the substrates 10 and 20 have vertical alignment films, provided as the surfaces of the substrates 10 and 20, which serve as alignment films 14 and 26, respectively. For this reason, in the liquid crystal panel 2, the liquid crystal molecules 31 align themselves perpendicularly to the surfaces of the substrates when no electric field is applied.

In the presence of an electric field, on the other hand, a potential difference between the combtooth electrodes 12 and 13 causes a transverse electric field to be generated as shown in FIG. 1, with the result that the line of electric force between the combtooth electrodes 12 and 13 is bent into a semicircle. Thus, when a p-type liquid crystal material is used, the liquid crystal molecules 31 are bend-arranged in such a way as to be arched along the thickness of the substrates as shown in FIG. 1. When an n-type liquid crystal material is used, the liquid crystal molecules 31 are bend-arranged in such a way as to be arched along the surfaces of the substrates. Thus, in either case, birefringence is exhibited in response to light traveling in a direction perpendicular to the surfaces of the substrates.

In this way, in the liquid crystal panel 2, the liquid crystal molecules 31 are moved (rotated) by a transverse electric field generated between the combtooth electrodes 12 and 13, whereby a display is carried out by controlling the amount of light that is transmitted by the liquid crystal panel 2.

Pressure unevenness (white unevenness) caused by cell thickness variation due to distortion (undulation) of a substrate as caused by the pressure force of the tip of a pen such as a touch pen stems from a difference in transmittance between a portion made different in cell thickness by pressing with the touch pen or the like and an unpressed portion where there is no change in cell thickness.

That is, pressure unevenness occurs because the transmittance of a portion made smaller in cell thickness by pressure becomes lower than the transmittance of a portion where there is no change in cell thickness.

In the liquid crystal panel 2 of the vertical-alignment transverse-electric-field mode, the liquid crystal molecules 31 look bend-arranged as seen from the cross-section of the liquid crystal panel 2. For this reason, even when a change in cell thickness (thickness of the liquid crystal layer 30) due to pressure entails distortion in the alignment of the liquid crystal molecules 31, the self-compensating effect, of bend arrangement makes it unlikely for any optical changes to come out.

Therefore, the liquid crystal panel 2 of the vertical-alignment transverse-electric-field mode varies less in transmittance even when it is pressed, thus making it unlikely for display unevenness (pressure unevenness) to be observed.

For this reason, the present invention reduces the amount of change in transmittance relative to cell thickness by switching the vertical alignment liquid crystal panel, in which the liquid crystal molecules align themselves perpendicularly when no electric field is applied, from the drive system using a longitudinal electric field generated between electrodes respectively provided on upper and lower substrates as in a liquid crystal panel of the MVA mode to the drive system using a transverse electric field generated between the combtooth electrodes 12 and 13 provided at least one of the substrates, namely the substrate 10, as described above.

However, a remarkable reduction in cell thickness of the liquid crystal panel 2 due to pressure makes it impossible for the self-compensation of bend arrangement to absorb the change in cell thickness. For this reason, pressure unevenness caused by cell thickness variation cannot be sufficiently remedied simply by using the vertical-alignment transverse-electric-field mode as described above.

Accordingly, as the second point to remedy pressure unevenness caused by cell thickness variation due to distortion (undulation) of the substrates (or, in particular, the upper substrate 20), the inventors focused their attention on transmittance distributions (transmittance distribution curves) formed in dark portions above the combtooth electrodes 12 and 13 whose respective transmittances are relatively low and in a bright portion between the combtooth electrodes 12 and 13 whose transmittance is relatively high.

In the liquid crystal panel 2 of the vertical-alignment transverse-electric-field mode, as shown in FIG. 1, those liquid crystal molecules 31 above the central parts of the combtooth electrodes 12 and 13 and the central part of the space between the combtooth electrodes 12 and 13 are always in vertical alignment. For this reason, no light is transmitted through the central parts of the combtooth electrodes 12 and 13 or the central part of the space between the combtooth electrodes 12 and 13. For this reason, in the liquid crystal panel 2, such transmittance distribution curves as shown in FIG. 1 are formed.

That is, in the liquid crystal panel 2, as shown in FIG. 1, there exist dead zones (dead regions) weak in field intensity where the liquid crystal molecules 31 are not tilted enough, and it is because of the presence of these dead zones that such transmittance distribution curves as shown in FIG. 1 are formed. That is, the dead zones are closely related to the transmittance distribution curves.

Figure 3:
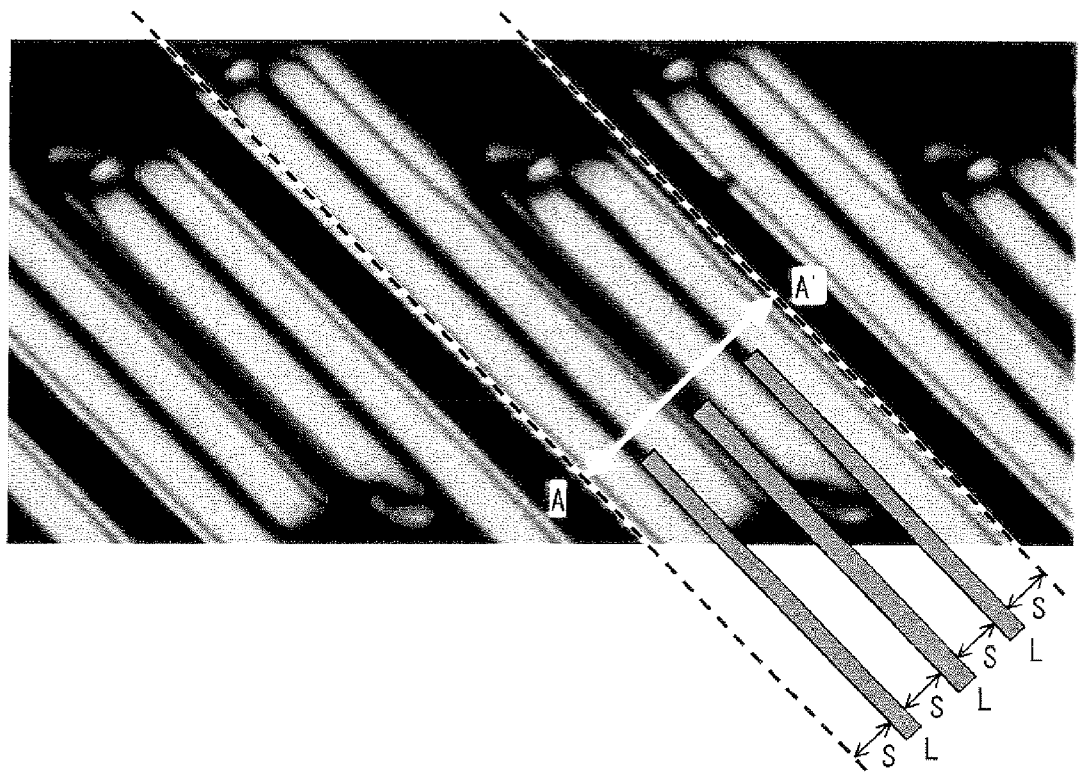
FIG. 3 shows an optical microscope image of the liquid crystal panel of FIG. 1 with an electric field applied thereto.

FIG. 3 shows an optical microscope image of the liquid crystal panel 2 with an electric field applied thereto (i.e., with the liquid crystal panel 2 turned on). In FIG. 3, the dark portions indicate dead zones.

The term "dead zone" can be defined as a region whose tone-luminance ratio (transmittance normalized by luminance) is 20% or lower when a unit region (indicated by the region A-A' in FIG. 3) in the optical microscope image of the liquid crystal panel 2, as shown in FIG. 3, with an electric field applied thereto (i.e., with the liquid crystal panel 2 turned on) is divided into 255 tones (0 to 255 tones) by image processing along an X axis perpendicular to the region and a luminance portion corresponding to the 255th tone (highest luminance) is normalized as 100%.

The term "unit region (indicated by the region A-A' in FIG. 3)" here means a region, represented by 3L+4S (where L is the width of each of the combtooth electrodes 12 and 13 and S is the electrode interval), which is located between one of the combtooth electrodes 12 and 13 and the other combtooth electrode adjacent thereto. Further, the image processing is executed by using commonly used image processing software.

FIG. 4 is a graph showing a result obtained when the region A-A' of FIG. 3 is divided into 255 tones by image processing and a luminance portion corresponding to the highest luminance among the 255 tones is normalized as 100%. Further, Tables 1 and 2 show a relationship between the respective luminances of 175 places into which the region A-A' of FIG. 3 has been divided along the X axis and the tone-luminance ratios obtained by normalizing these luminances. In the example shown in FIG. 3, the electrode interval S is 7.5 μm, and the electrode width L is 3.7 μm.

TABLE 1

| Place | Luminance | Tone-luminance ratio |
|---|---|---|
| 1 | 8 | 5.3% |
| 2 | 7 | 4.6% |
| 3 | 5 | 3.3% |
| 4 | 6 | 3.9% |
| 5 | 8 | 5.3% |
| 6 | 10 | 6.6% |
| 7 | 13 | 8.6% |
| 8 | 16 | 10.5% |
| 9 | 17 | 11.2% |
| 10 | 18 | 11.8% |
| 11 | 25 | 16.4% |
| 12 | 59 | 38.8% |
| 13 | 105 | 69.1% |
| 14 | 134 | 88.2% |
| 15 | 141 | 92.8% |
| 16 | 135 | 88.8% |
| 17 | 124 | 81.6% |
| 18 | 93 | 61.2% |
| 19 | 73 | 48.0% |
| 20 | 74 | 48.7% |
| 21 | 90 | 59.2% |
| 22 | 115 | 75.7% |
| 23 | 131 | 86.2% |
| 24 | 143 | 94.1% |
| 25 | 149 | 98.0% |
| 26 | 149 | 98.0% |
| 27 | 150 | 98.7% |
| 28 | 151 | 99.3% |
| 29 | 150 | 98.7% |
| 30 | 149 | 98.0% |
| 31 | 147 | 96.7% |
| 32 | 147 | 96.7% |
| 33 | 147 | 96.7% |
| 34 | 147 | 96.7% |
| 35 | 146 | 96.1% |
| 36 | 144 | 94.7% |
| 37 | 141 | 92.8% |

TABLE 1-continued

| Place | Luminance | Tone-luminance ratio |
|---|---|---|
| 38 | 137 | 90.1% |
| 39 | 131 | 86.2% |
| 40 | 122 | 80.3% |
| 41 | 113 | 74.3% |
| 42 | 92 | 60.5% |
| 43 | 67 | 44.1% |
| 44 | 46 | 30.3% |
| 45 | 30 | 19.7% |
| 46 | 24 | 15.8% |
| 47 | 22 | 14.5% |
| 48 | 20 | 13.2% |
| 49 | 24 | 15.8% |
| 50 | 30 | 19.7% |
| 51 | 40 | 26.3% |
| 52 | 59 | 38.8% |
| 53 | 84 | 55.3% |
| 54 | 102 | 67.1% |
| 55 | 116 | 76.3% |
| 56 | 126 | 82.9% |
| 57 | 134 | 88.2% |
| 58 | 140 | 92.1% |
| 59 | 142 | 93.4% |
| 60 | 145 | 95.4% |
| 61 | 147 | 96.7% |
| 62 | 147 | 96.7% |
| 63 | 147 | 96.7% |
| 64 | 148 | 97.4% |
| 65 | 149 | 98.0% |
| 66 | 149 | 98.0% |
| 67 | 149 | 98.0% |
| 68 | 150 | 98.7% |
| 69 | 149 | 98.0% |
| 70 | 150 | 98.7% |
| 71 | 149 | 98.0% |
| 72 | 148 | 97.4% |
| 73 | 148 | 97.4% |
| 74 | 140 | 92.1% |
| 75 | 120 | 78.9% |
| 76 | 93 | 61.2% |
| 77 | 70 | 46.1% |
| 78 | 61 | 40.1% |
| 79 | 65 | 42.8% |
| 80 | 72 | 47.4% |
| 81 | 78 | 51.3% |
| 82 | 78 | 51.3% |
| 83 | 70 | 46.1% |
| 84 | 58 | 38.2% |
| 85 | 40 | 26.3% |
| 86 | 30 | 19.7% |
| 87 | 26 | 17.1% |
| 88 | 18 | 11.8% |
| 89 | 14 | 9.2% |
| 90 | 14 | 9.2% |
| 91 | 12 | 7.9% |
| 92 | 11 | 7.2% |
| 93 | 13 | 8.6% |
| 94 | 14 | 9.2% |
| 95 | 17 | 11.2% |
| 96 | 24 | 15.8% |
| 97 | 35 | 23.0% |
| 98 | 42 | 27.6% |
| 99 | 51 | 33.6% |
| 100 | 53 | 34.9% |

TABLE 2

| Place | Luminance | Tone-luminance ratio |
|---|---|---|
| 101 | 56 | 36.8% |
| 102 | 63 | 41.4% |
| 103 | 72 | 47.4% |
| 104 | 91 | 59.9% |
| 105 | 119 | 78.3% |
| 106 | 134 | 88.2% |
| 107 | 147 | 96.7% |

TABLE 2-continued

| Place | Luminance | Tone-luminance ratio |
|---|---|---|
| 108 | 151 | 99.3% |
| 109 | 149 | 98.0% |
| 110 | 149 | 98.0% |
| 111 | 147 | 96.7% |
| 112 | 146 | 96.1% |
| 113 | 145 | 95.4% |
| 114 | 145 | 95.4% |
| 115 | 147 | 96.7% |
| 116 | 148 | 97.4% |
| 117 | 148 | 97.4% |
| 118 | 147 | 96.7% |
| 119 | 146 | 96.1% |
| 120 | 144 | 94.7% |
| 121 | 142 | 93.4% |
| 122 | 139 | 91.4% |
| 123 | 134 | 88.2% |
| 124 | 127 | 83.6% |
| 125 | 117 | 77.0% |
| 126 | 104 | 68.4% |
| 127 | 82 | 53.9% |
| 128 | 60 | 39.5% |
| 129 | 41 | 27.0% |
| 130 | 28 | 18.4% |
| 131 | 23 | 15.1% |
| 132 | 19 | 12.5% |
| 133 | 19 | 12.5% |
| 134 | 26 | 17.1% |
| 135 | 35 | 23.0% |
| 136 | 47 | 30.9% |
| 137 | 68 | 44.7% |
| 138 | 88 | 57.9% |
| 139 | 108 | 71.1% |
| 140 | 118 | 77.6% |
| 141 | 128 | 84.2% |
| 142 | 137 | 90.1% |
| 143 | 144 | 94.7% |
| 144 | 146 | 96.1% |
| 145 | 147 | 96.7% |
| 146 | 148 | 97.4% |
| 147 | 151 | 99.3% |
| 148 | 152 | 100.0% |
| 149 | 150 | 98.7% |
| 150 | 149 | 98.0% |
| 151 | 149 | 98.0% |
| 152 | 148 | 97.4% |
| 153 | 147 | 96.7% |
| 154 | 149 | 98.0% |
| 155 | 150 | 98.7% |
| 156 | 148 | 97.4% |
| 157 | 138 | 90.8% |
| 158 | 117 | 77.0% |
| 159 | 90 | 59.2% |
| 160 | 77 | 50.7% |
| 161 | 74 | 48.7% |
| 162 | 88 | 57.9% |
| 163 | 118 | 77.6% |
| 164 | 131 | 86.2% |
| 165 | 123 | 80.9% |
| 166 | 95 | 62.5% |
| 167 | 55 | 36.2% |
| 168 | 26 | 17.1% |
| 169 | 19 | 12.5% |
| 170 | 16 | 10.5% |
| 171 | 16 | 10.5% |
| 172 | 14 | 9.2% |
| 173 | 11 | 7.2% |
| 174 | 10 | 6.6% |
| 175 | 10 | 6.6% |

Figure 5:
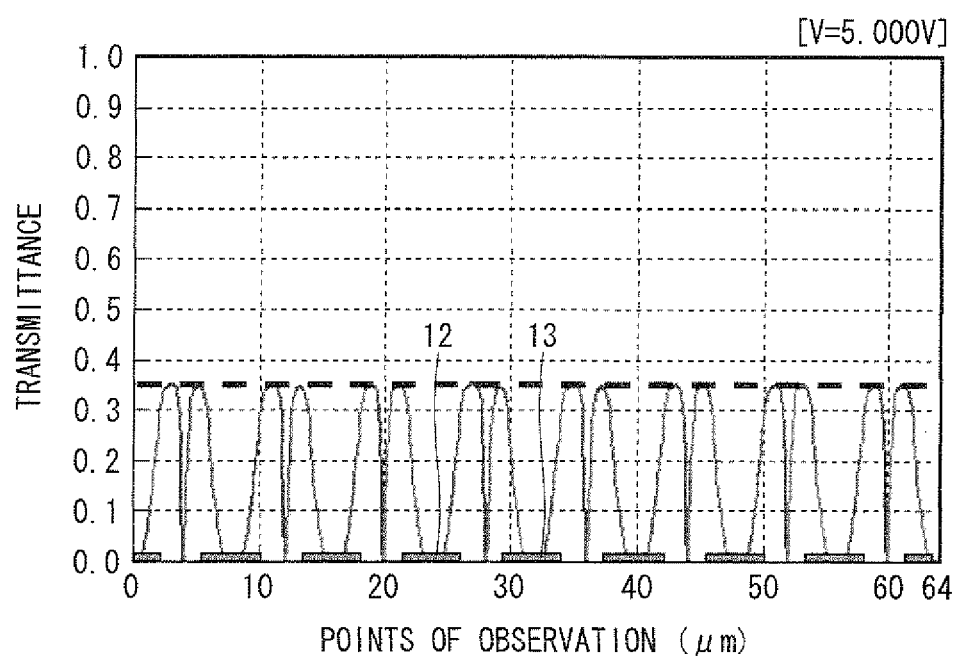
FIG. 5 is a graph showing a relationship between the positions and transmittances of combtooth electrodes in the absence of displacement of a substrate as observed when the liquid crystal panel of FIG. 1 is driven by a transverse electric field.

Further, FIG. 5 is a graph showing a relationship between the positions and transmittances (transmittance distribution curves) of the combtooth electrodes 12 and 13 in the absence of displacement of the substrate 20 as observed when the liquid crystal panel 2 is driven by a transverse electric field.

In the present embodiment, a transmittance distribution curve is hereinafter represented by light transmittance as obtained when the transmittance of air is defined as 1.0

(100%). That is, the transmittance of the panel is 35% in the settings where the polarizing plates 35 and 36 are disposed so that their transmission axes are orthogonal and the liquid crystal layer 30 has a phase difference of ½λ when an electric field is applied (when a voltage is applied).

As evidenced by FIGS. 3 and 5, the dead zones are formed mainly in portions above the combtooth electrodes 12 and 13, which are electrode line parts.

Since the liquid crystal molecules 31 are not tilted enough when the liquid crystal panel 2 is not pressed, the dead zones are small in retardation (Δnd) and therefore unlikely to affect display quality.

Further, when the vertical alignment liquid crystal panel 2 is driven by a transverse electric field in a transverse electric field mode as in the case of the present invention, the transmittance distribution is determined, as shown in FIG. 5, in relation to the width L of each of the combtooth electrodes 12 and 13, which is a line part, and the interval S between the combtooth electrodes 12 and 13, which is a space part (i.e., an alignment region).

Therefore, for smaller transmittance distribution curves, it is only necessary to increase the proportion (rate of occupation by dead zones) of the dead zones (i.e., regions whose respective tone-luminance ratios are 20% or lower) to the total number of places (regions) into which the unit region has been divided along the X axis. This is achieved most easily and most effectively, for example, by reducing the electrode interval S.

That is, in order to remedy pressure unevenness caused by cell thickness variation due to distortion (undulation) of the substrates (or, in particular, the upper substrate 20) in the liquid crystal panel of the display system (vertical-alignment transverse-electric-field mode), it is only necessary to render the curves of distribution of transmittance along a direction parallel to the surfaces of the substrates smaller by reducing the electrode interval S.

By rendering the curves of distribution of transmittance along a direction parallel to the surfaces of the substrates smaller as described above, the present invention can reduce a difference in transmittance distribution between a portion with displacement of the substrate 20 (with cell thickness variation) and a portion without such displacement. For this reason, even when the influence of undulation of the substrate 20 on cell thickness causes a variation in cell thickness and the variation (displacement) entails a change in transmittance along a direction parallel to the surfaces of the substrates, the change can be averaged out and therefore suppressed.

In the following, a preferred range of proportions A (i.e., S/(S+L)) of the electrode interval S to the sum of the electrode width L and the electrode interval S and a preferred range of rates of occupation by dead zone, which are provided for remedying pressure unevenness caused by cell thickness variation, are explained (verified) in concrete terms in accordance with experimental results.

First, for comparison, changes in transmittance (pressure unevenness) of a conventional liquid crystal panel of the MVA mode are evaluated.

In the examples and comparative examples below, the evaluation of display unevenness (pressure unevenness) with eyes (hereinafter referred to as "visual evaluation") was carried out by placing a prepared liquid crystal panel on a backlight 4 and checking display unevenness with eyes while pressing the liquid crystal panel with a touch pen so that the amount of displacement of a substrate (amount of variation in cell thickness) was 0.08 μm.

The visual evaluation was carried out based on display unevenness in a conventional liquid crystal panel 102 (see FIG. 21) of the MVA mode shown below in the comparative example. That is, those liquid crystal panels found with eyes to be equal in display unevenness to the light crystal panel 102 were judged as "poor". Those liquid crystal panels found with eyes to be much lighter in degree of display unevenness than the liquid crystal panel 102 were judged as "very good".

Those liquid crystal panels found with eyes to be lighter in display unevenness than the liquid crystal panel 102 were judged as "good".

COMPARATIVE EXAMPLE

Figure 21:
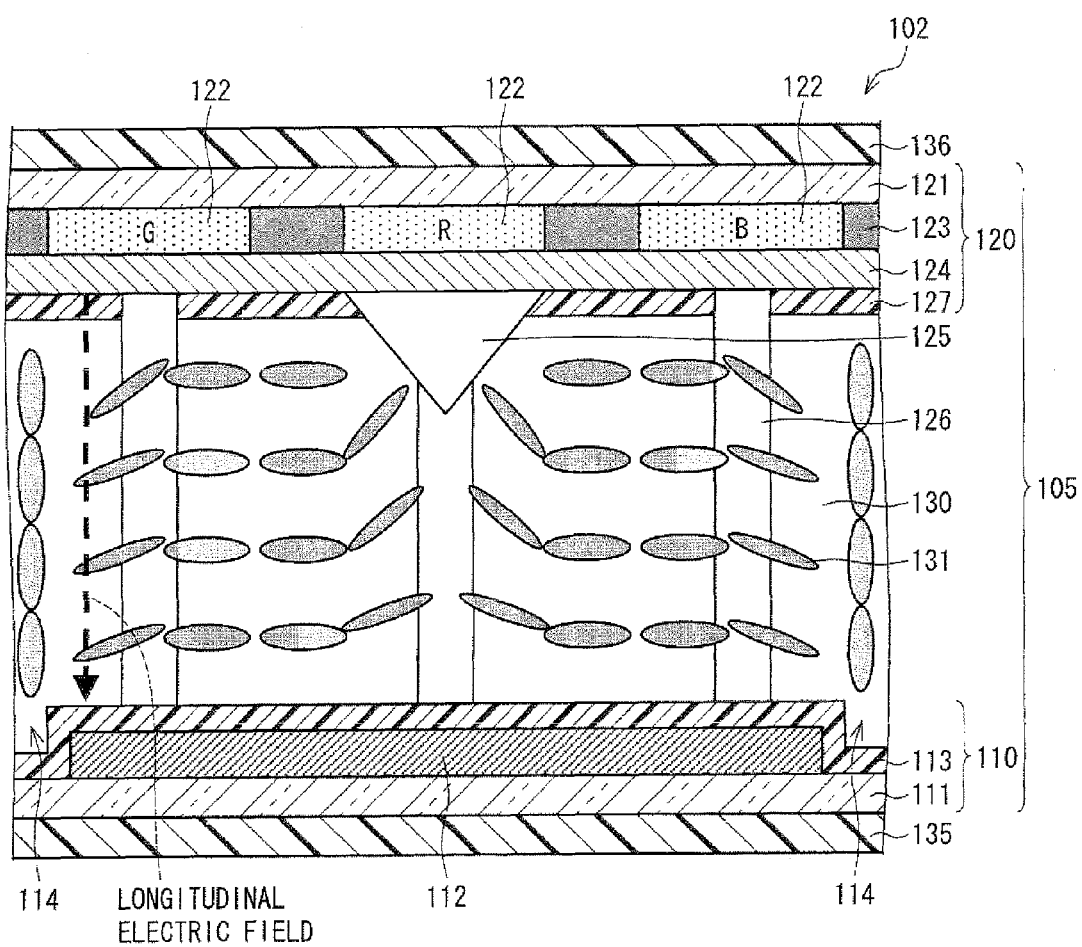
FIG. 21 is a cross-sectional view schematically showing the configuration of a main part of a conventional typical liquid crystal panel of the MVA mode.

FIG. 21 is a cross-sectional view schematically showing the configuration of a main part of a conventional typical liquid crystal panel of the MVA mode.

As shown in FIG. 21, the conventional liquid crystal panel 102 of the MVA mode includes: a substrate 110 provided with an ITO electrode 112 having slit sections 114; a substrate 120, provided with color filters 122 and a black matrix 123, which has alignment controlling ribs 125 and columnar spacers 126 provided on a solid ITO electrode 124; and a liquid crystal layer 130 sandwiched between the substrates 110 and 120.

The configuration of the liquid crystal panel 102 is described below in detail in conjunction with a specific example fabrication of the liquid crystal panel 102 and therefore is not described here in detail.

In the liquid crystal panel 102, the liquid crystal layer 130 is made of a negative liquid crystal material that aligns itself perpendicularly when no electric field is applied ((i.e., when the liquid crystal panel 102 is off), and is driven by a longitudinal electric field (vertical electric field) perpendicular to surfaces of the substrates. Thus, the liquid crystal director in the liquid crystal panel 102 is controlled by the slit sections 114 of the substrate 110 and the ribs 125 of the substrate 120 to be aligned as shown in FIG. 21.

Next, a method for fabricating such a liquid crystal panel 102 is described below with reference to FIG. 21.

First, an ITO film was formed entirely on a surface of a glass substrate 111 similar to the glass substrate 11 by sputtering in such a way as to have a thickness of 100 nm. After that, the ITO film was patterned by photolithograph, whereby an ITO electrode 112 having a width of 56 μm was formed as a pixel electrode in each pixel on the glass substrate 111.

Next, alignment film paint (manufactured by JSR Corporation; marketed as "JALS-204"; with a solid content of 5 wt. %, γ-butyrolactone solution) was applied onto the glass substrate 111 by spin coating in such a way as to cover the ITO electrode 112. After that, by calcination for two hours at 200° C., a substrate 110 was formed which had a vertical alignment film similar to that of Example 1 provided as an alignment film 113 on that one of its surfaces which would face a liquid crystal layer 130.

Meanwhile, color filters 122 and a black matrix 123 were formed on a glass substrate 121 similar to the glass substrate 21 in the usual manner. Furthermore, an ITO electrode 124 was formed as a common electrode on the color filters 122 and the black matrix 123 by forming an ITO film entirely on the color filters 122 and the black matrix 123 so that the ITO film had a thickness of 100 nm.

Subsequently, a rib 125 having a height of 1.2 μm and a width of 11 μm was formed in each pixel by applying acrylic resin onto the ITO electrode 24 by spin coating and patterning the resin by photolithography.

Next, columnar spacers 126 each having a height of 3.4 μm was formed by applying a columnar spacer material onto the ITO electrode 124 by spin coating and patterning the material by photolithography.

After that, a vertical alignment film was formed as an alignment film 127 on the ITO electrode 124 with the same material and process as the alignment film 113. Thus formed was a substrate 120 provided with the columnar spacers 126. The dry film thickness of each of the alignment films 113 and 127 thus formed was 1,000 Å (=0.1 μm).

Next, sealing resin (manufactured by Mitsui Toatsu Chemicals, Inc.; marketed as Struct Bond XN-21S) was printed as a sealing agent on one of the substrates 110 and 120.

After that, the substrates 110 and 120 were joined to each other and calcined for one hour at 135° C. to form a liquid crystal cell 105 having a cell thickness d of 3.3 μm.

Next, a negative liquid crystal material (manufactured by Merck; as Δ∈=−3, Δn=0.1) was encapsulated as a liquid crystal material into the liquid crystal cell 105 by vacuum injection, whereby a liquid crystal layer 130 was formed.

Subsequently, polarizing plates 135 and 136 were joined onto the front and back surfaces of the liquid crystal cell 105, respectively, so that their transmission axes were orthogonal to each other. Thus fabricated was a liquid crystal panel 102 configured as shown in FIG. 21.

The liquid crystal panel 102 thus fabricated was placed on a backlight 4 as shown in FIG. 2 and evaluated for display unevenness with eyes (visual evaluation) while pressing the liquid crystal panel 102 with a touch pen so that the amount of displacement of the substrate 20 (amount of variation in cell thickness) was 0.08 μm.

Meanwhile, a simulator (manufactured by SHINTECH, Inc.; marketed as "LCD-Master 2F") was used to run a simulation by using as a model the liquid crystal panel 102 fabricated under the above conditions, whereby voltage-transmittance changes as observed when the displacement (amount of variation in cell thickness) of the substrate 20 due to pressure was 0 μm and when it was 0.8 μm were examined.

Further, FIG. 22 shows the results obtained by setting as 100% the value of transmittance calculated by this simulation when a voltage of 7 V was applied to the liquid crystal panel 2 and plotting voltage-transmittance changes by luminance ratio at displacements of 0 μm and 0.8 μm. Table 3 shows the maximum variation width of transmittance as calculated by the simulation, the value of S/(L+S), and the visual evaluation result. In the present embodiment, the transmittance is the transmittance of the front of the liquid crystal panel 2 as calculated by dividing the luminance of the liquid crystal panel 2 by the luminance of the backlight 4.

Figure 23:
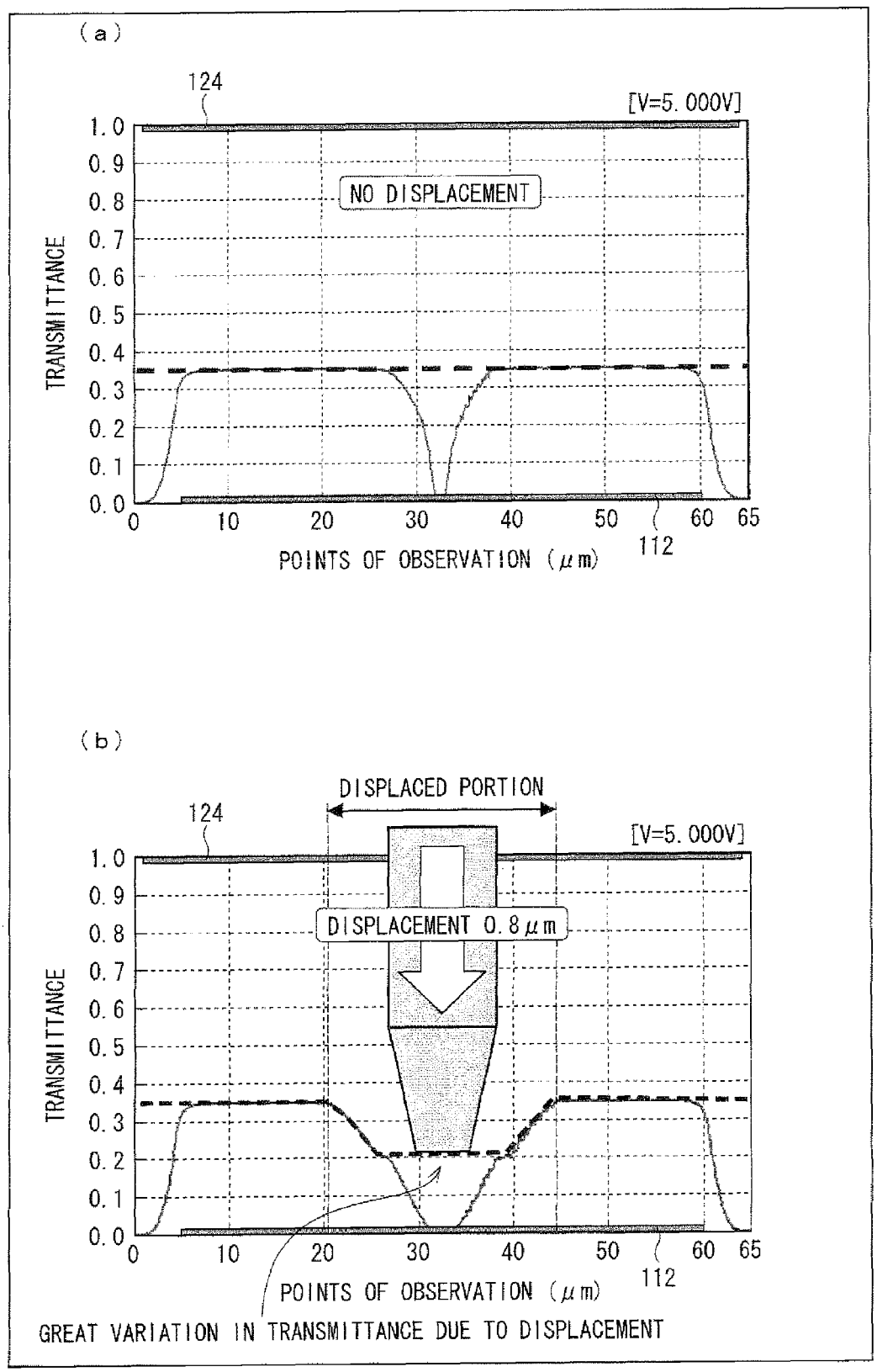
FIG. 23 includes: a graph (a) showing a relationship between the positions and transmittances of ITO electrodes in the absence of displacement of a substrate as observed when the liquid crystal panel of FIG. 21 is driven by a longitudinal electric field; and a graph (b) showing a relationship between the positions and transmittances of ITO electrodes as observed when the liquid crystal panel of FIG. 21 is driven by a longitudinal electric field with the substrate displaced by 0.8 µm.

Further, (a) and (b) of FIG. 23 each shows the positions and transmittances of the ITO electrodes 112 and 124, provided on the upper and lower substrates 110 and 120 respectively, as observed when the liquid crystal panel 102 was driven by a longitudinal electric field.

FIG. 23 includes: a graph (a) showing a relationship between the positions and transmittances of the ITO electrodes 112 and 124 in the absence of displacement of the substrate 120 as observed when the liquid crystal panel 102 was driven by a longitudinal electric field; and a graph (b) showing a relationship between the positions and transmittances of the ITO electrodes 112 and 124 as observed when the liquid crystal panel 102 was driven by a longitudinal electric field with the substrate 120 displaced by 0.8 μm.

As evidenced by (a) and (b) of FIG. 23, the conventional liquid crystal panel 102 of the MVA mode as described above varies greatly in transmittance in response to displacement of the substrate 120.

Subsequently, changes in transmittance (pressure unevenness) of liquid crystal panels 2 under varying conditions with varying electrode intervals S were evaluated in order that a preferred range of S/(S+L) and a preferred range of rates of occupation by dead zones in the liquid crystal panel 2 of FIG. 1 were determined.

The following explains the fabrication and results of evaluation of liquid crystal panels 2 represented by liquid crystal panels (1) to (6), evaluated as described above, and structured as described in FIG. 1.

[Liquid Crystal Panel (1)]

First, as shown in FIG. 1, an ITO (indium tin oxide) film was formed entirely on a surface of a glass substrate 11 by sputtering in such a way as to have a thickness of 100 nm. After that, the ITO film was patterned by photolithograph, whereby combtooth electrodes 12 and 13 composed of the ITO film were formed as common electrodes and pixel electrodes, respectively, on the glass substrate 11 so that the electrode width L was 4 μm and the electrode interval S was 4 μm.

Next, alignment film paint (manufactured by JSR Corporation; marketed as "JALS-204"; with a solid content of 5 wt. %, γ-butyrolactone solution) was applied onto the glass substrate 11 by spin coating in such a way as to cover the combtooth electrode 12 and 13. After that, by calcination for two hours at 200° C., a substrate 10 was formed which had a vertical alignment film provided as an alignment film 14 on that one of its surfaces which would face a liquid crystal layer 30.

Meanwhile, color filters 22 and a black matrix 23 were formed on a glass substrate 21 in the usual manner. Furthermore, a planarizing film 24 was formed on the color filters 122 and the black matrix 123 by forming an overcoat from acrylic resin or the like on the color filters 122 and the black matrix 123 by spin coating so that the overcoat had a thickness of 100 nm and calcining the overcoat for one hours at 200° C.

Next, columnar spacers 25 each having a height of 3.4 μm was formed by applying a columnar spacer material onto the planarizing film 24 by spin coating and patterning the material by photolithography.

After that, a vertical alignment film was formed as an alignment film 26 on the planarizing film 24 with the same material and process as the alignment film 14. Thus formed was a substrate 20 provided with the columnar spacers 25. The dry film thickness of each of the alignment films 14 and 26 thus formed was 1,000 Å (=0.1 μm).

Next, sealing resin (manufactured by Mitsui Toatsu Chemicals, Inc.; marketed as Struct Bond XN-21S) was printed as a sealing agent on one of the substrates 10 and 20.

After that, the substrates 10 and 20 were joined to each other and calcined for one hour at 135° C. to form a liquid crystal cell 5 having a cell thickness d of 3.3 μm.

Next, a positive liquid crystal material (manufactured by Merck; Δ∈=18, Δn=0.1) was encapsulated as a liquid crystal material into the liquid crystal cell 5 by vacuum injection, whereby a liquid crystal layer 30 was formed.

Subsequently, polarizing plates 35 and 36 were joined onto the front and back surfaces of the liquid crystal cell 105, respectively, so that their transmission axes were orthogonal and formed an angle of 45° with the direction along which the combtooth electrodes 12 and 13 extended. Thus fabricated was a liquid crystal panel (1) configured as shown in FIG. 1.

The liquid crystal panel (1) thus fabricated was placed on a backlight 4 as shown in FIG. 2 and evaluated for display unevenness with eyes (visual evaluation) while pressing the liquid crystal panel (1) with a touch pen so that the amount of displacement of the substrate 20 (amount of variation in cell thickness) was 0.08 μm.

Meanwhile, as in the comparative example, the "LCD-Master 2F" was used to run a simulation by using as a model the liquid crystal panel (1) fabricated under the above conditions, whereby voltage-transmittance changes as observed when the displacement (amount of variation in cell thickness) of the substrate 20 due to pressure was 0 μm and when it was 0.8 μm were examined.

Figure 6:
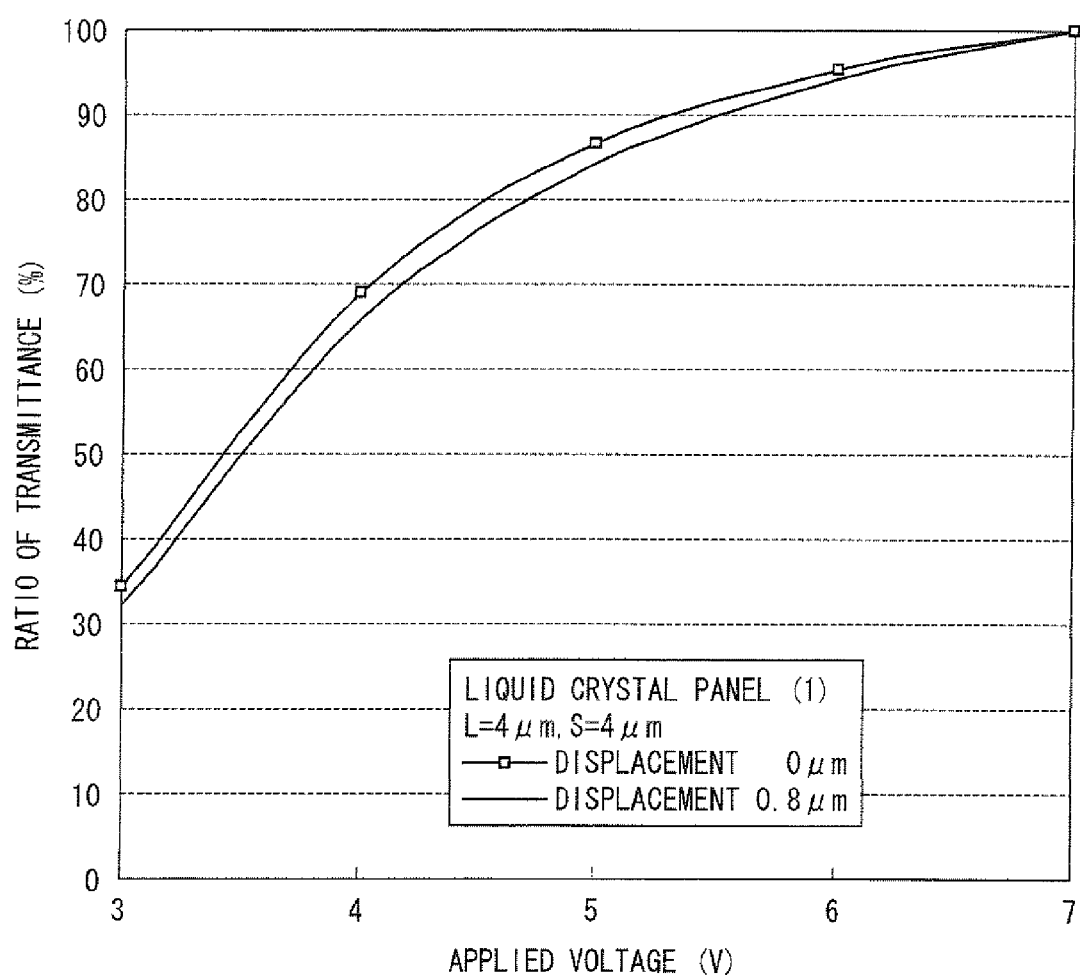
FIG. 6 is a graph showing a relationship between the voltage applied and the ratio of transmittance by pressure as observed when L=4 μm and S=4 μm in a liquid crystal panel of FIG. 1.

Further, FIG. 6 shows the results obtained by setting as 100% the value of transmittance calculated by this simulation when a voltage of 7 V was applied to the liquid crystal panel (1) and plotting voltage-transmittance changes by luminance ratio at displacements of 0 μm and 0.8 μm. Table 3 shows the maximum variation width of transmittance as calculated by the simulation, the value of S/(L+S), and the visual evaluation result.

[Liquid Crystal Panel (2)]

As a liquid crystal panel 2 configured as shown in FIG. 1, a liquid crystal panel (2) was fabricated in the same manner as the liquid crystal panel (1) except that the electrode interval S was not 4 μm but 5 μm.

The liquid crystal panel (2) thus fabricated was visually inspected in the same manner as the liquid crystal panel (1). Further, the "LCD-Master 2F" was used to run a simulation by using as a model the liquid crystal panel (2) fabricated under the above conditions, whereby voltage-transmittance changes as observed when the displacement of the substrate 20 due to pressure was 0 μm and when it was 0.8 μm were examined.

Figure 7:
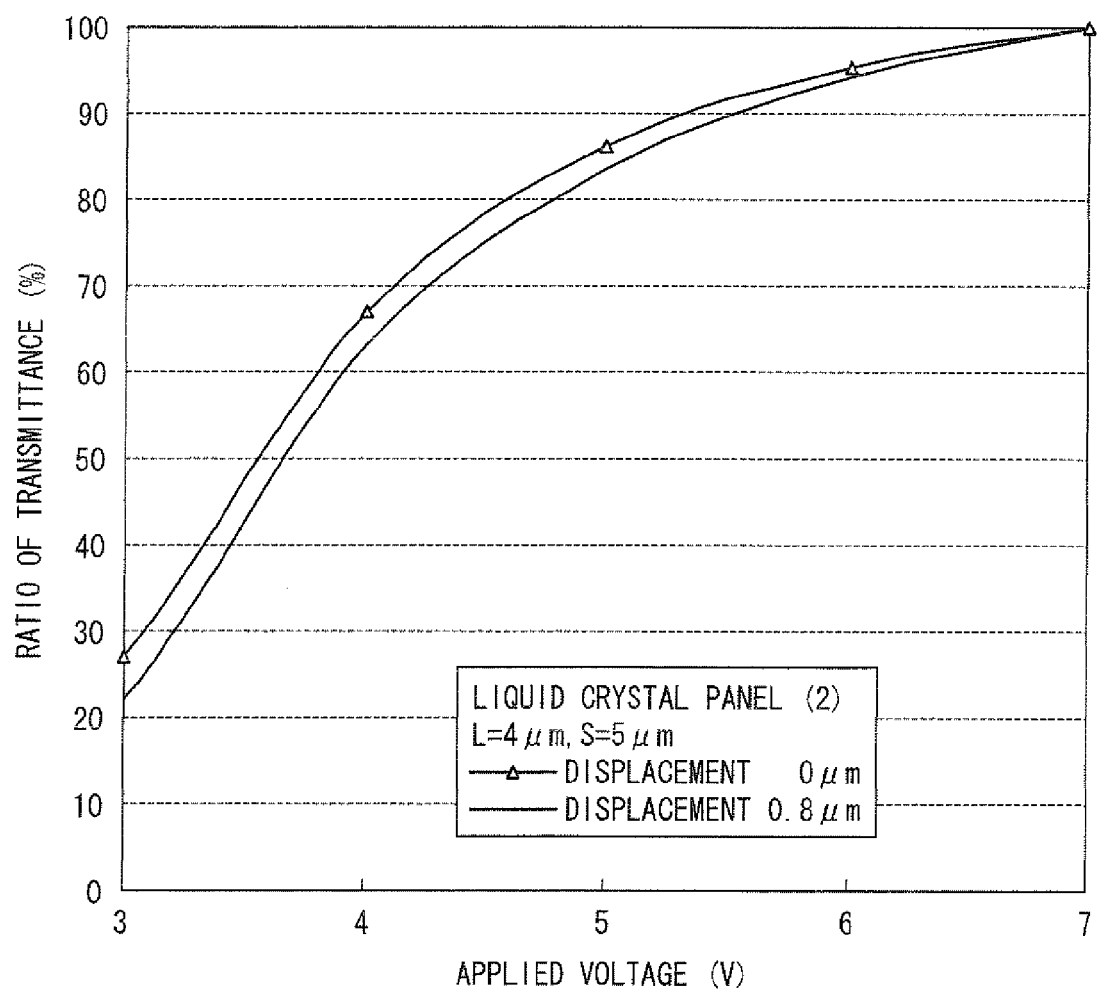
FIG. 7 is a graph showing a relationship between the voltage applied and the ratio of transmittance by pressure as observed when L=4 μm and S=5 μm in a liquid crystal panel of FIG. 1.

Further, FIG. 7 shows the results obtained by setting as 100% the value of transmittance calculated by this simulation when a voltage of 7 V was applied to the liquid crystal panel (2) and plotting voltage-transmittance changes by luminance ratio at displacements of 0 μm and 0.8 μm. Table 3 shows the maximum variation width of transmittance as calculated by the simulation, the value of S/(L+S), and the visual evaluation result.

[Liquid Crystal Panel (3)]

As a liquid crystal panel 2 configured as shown in FIG. 1, a liquid crystal panel (3) was fabricated in the same manner as the liquid crystal panel (1) except that the electrode interval S was not 4 μm but 6 μm.

The liquid crystal panel (3) thus fabricated was visually inspected in the same manner as the liquid crystal panel (1). Further, the "LCD-Master 2F" was used to run a simulation by using as a model the liquid crystal panel (3) fabricated under the above conditions, whereby voltage-transmittance changes as observed when the displacement of the substrate 20 due to pressure was 0 μm and when it was 0.8 μm were examined.

Figure 8:
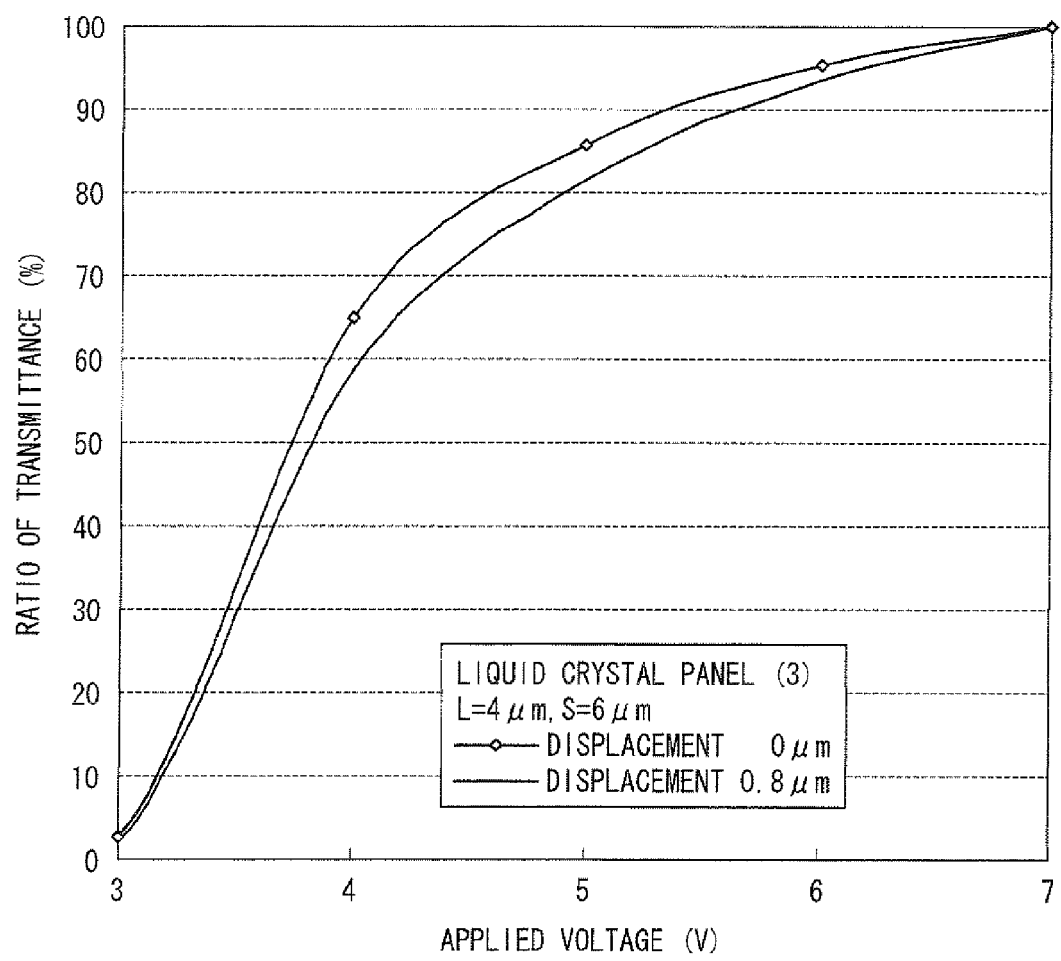
FIG. 8 is a graph showing a relationship between the voltage applied and the ratio of transmittance by pressure as observed when L=4 μm and S=6 μm in a liquid crystal panel of FIG. 1.

Further, FIG. 8 shows the results obtained by setting as 100% the value of transmittance calculated by this simulation when a voltage of 7 V was applied to the liquid crystal panel (3) and plotting voltage-transmittance changes by luminance ratio at displacements of 0 μm and 0.8 μm. Table 3 shows the maximum variation width of transmittance as calculated by the simulation, the value of S/(L+S), and the visual evaluation result.

[Liquid Crystal Panel (4)]

As a liquid crystal panel 2 configured as shown in FIG. 1, a liquid crystal panel (4) was fabricated in the same manner as the liquid crystal panel (1) except that the electrode interval S was not 4 μm but 7 μm.

The liquid crystal panel (4) thus fabricated was visually inspected in the same manner as the liquid crystal panel (1). Further, the "LCD-Master 2F" was used to run a simulation by using as a model the liquid crystal panel (4) fabricated under the above conditions, whereby voltage-transmittance changes as observed when the displacement of the substrate 20 due to pressure was 0 μm and when it was 0.8 μm were examined.

Figure 9:
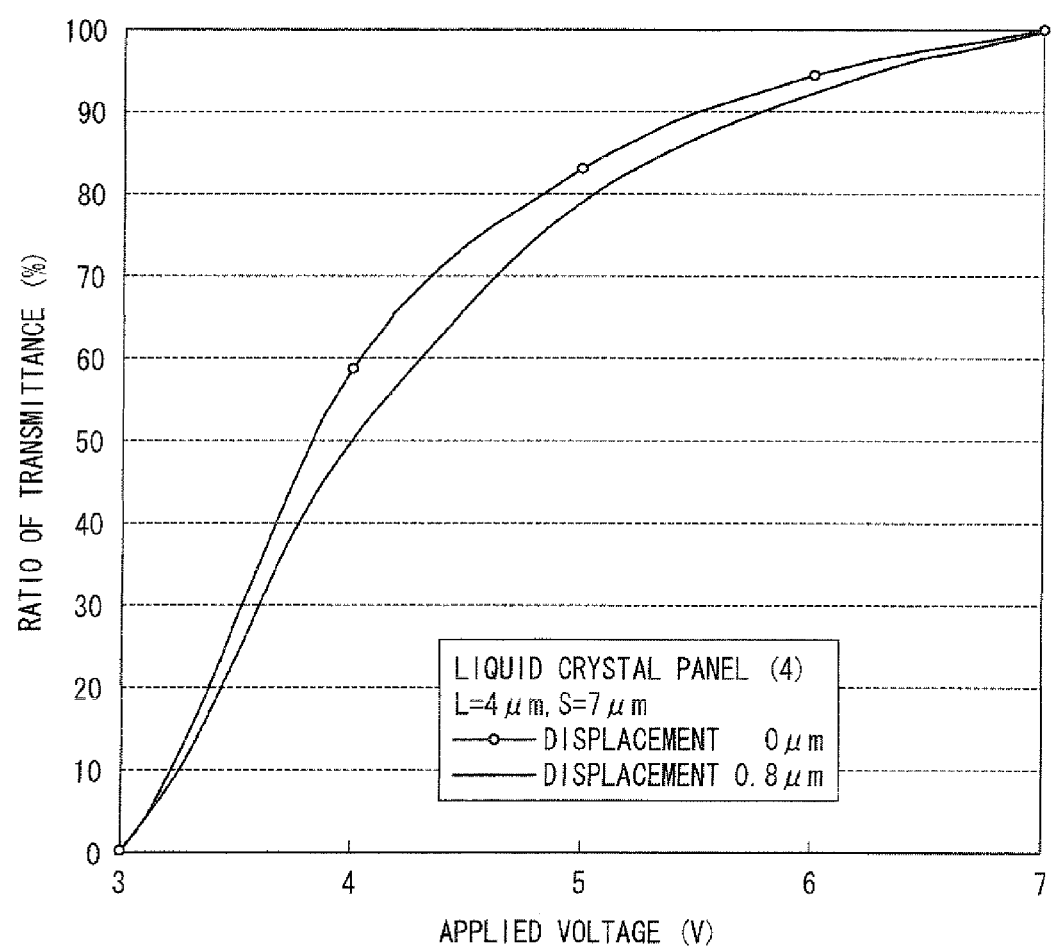
FIG. 9 is a graph showing a relationship between the voltage applied and the ratio of transmittance by pressure as observed when L=4 μm and S=7 μm in a liquid crystal panel of FIG. 1.

Further, FIG. 9 shows the results obtained by setting as 100% the value of transmittance calculated by this simulation when a voltage of 7 V was applied to the liquid crystal panel (4) and plotting voltage-transmittance changes by luminance ratio at displacements of 0 μm and 0.8 μm. Table 3 shows the maximum variation width of transmittance as calculated by the simulation, the value of S/(L+S), and the visual evaluation result.

[Liquid Crystal Panel (5)]

As a liquid crystal panel 2 configured as shown in FIG. 1, a liquid crystal panel (5) was fabricated on the same conditions as the liquid crystal panel (1) except that the electrode interval was not 4 μm but 2 μm. Further, the "LCD-Master 2F" was used to run a simulation by using as a model the liquid crystal panel (5) thus fabricated, whereby voltage-transmittance changes as observed when the displacement of the substrate 20 due to pressure was 0 μm and when it was 0.8 μm were examined.

Figure 10:
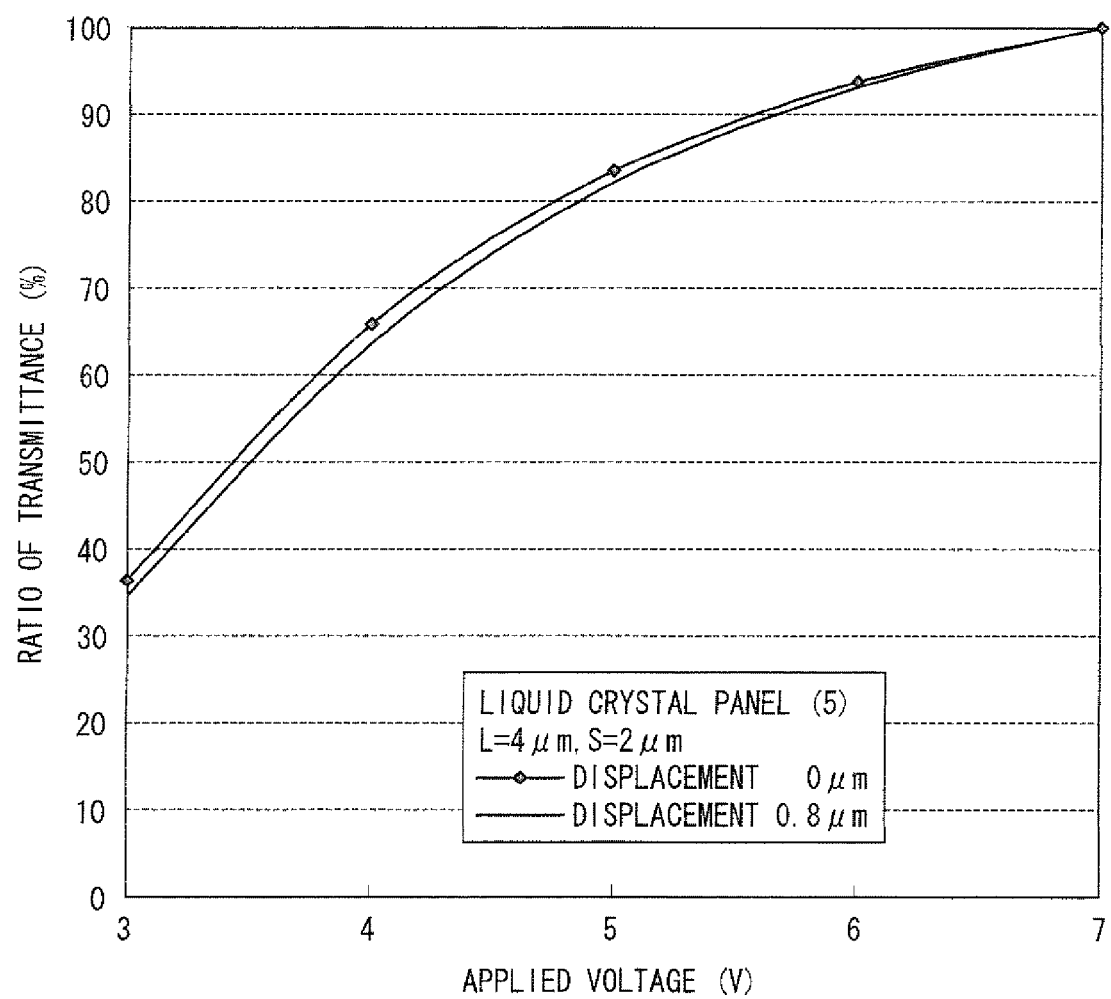
FIG. 10 is a graph showing a relationship between the voltage applied and the ratio of transmittance by pressure as observed when L=4 μm and S=2 μm in a liquid crystal panel of FIG. 1.

Further, FIG. 10 shows the results obtained by setting as 100% the value of transmittance calculated by this simulation when a voltage of 7 V was applied to the liquid crystal panel (5) and plotting voltage-transmittance changes by luminance ratio at displacements of 0 μm and 0.8 μm. Table 3 shows the maximum variation width of transmittance as calculated by the simulation, the value of S/(L+S), and the visual evaluation result.

[Liquid Crystal Panel (6)]

As a liquid crystal panel 2 configured as shown in FIG. 1, a liquid crystal panel (6) was fabricated in the same manner as the liquid crystal panel (1) except that the electrode interval S was not 4 μm but 8 μm.

The liquid crystal panel (6) thus fabricated was visually inspected in the same manner as the liquid crystal panel (1). Further, the "LCD-Master 2F" was used to run a simulation by using as a model the liquid crystal panel (6) fabricated under the above conditions, whereby voltage-transmittance changes as observed when the displacement of the substrate 20 due to pressure was 0 μm and when it was 0.8 μm were examined.

Figure 11:
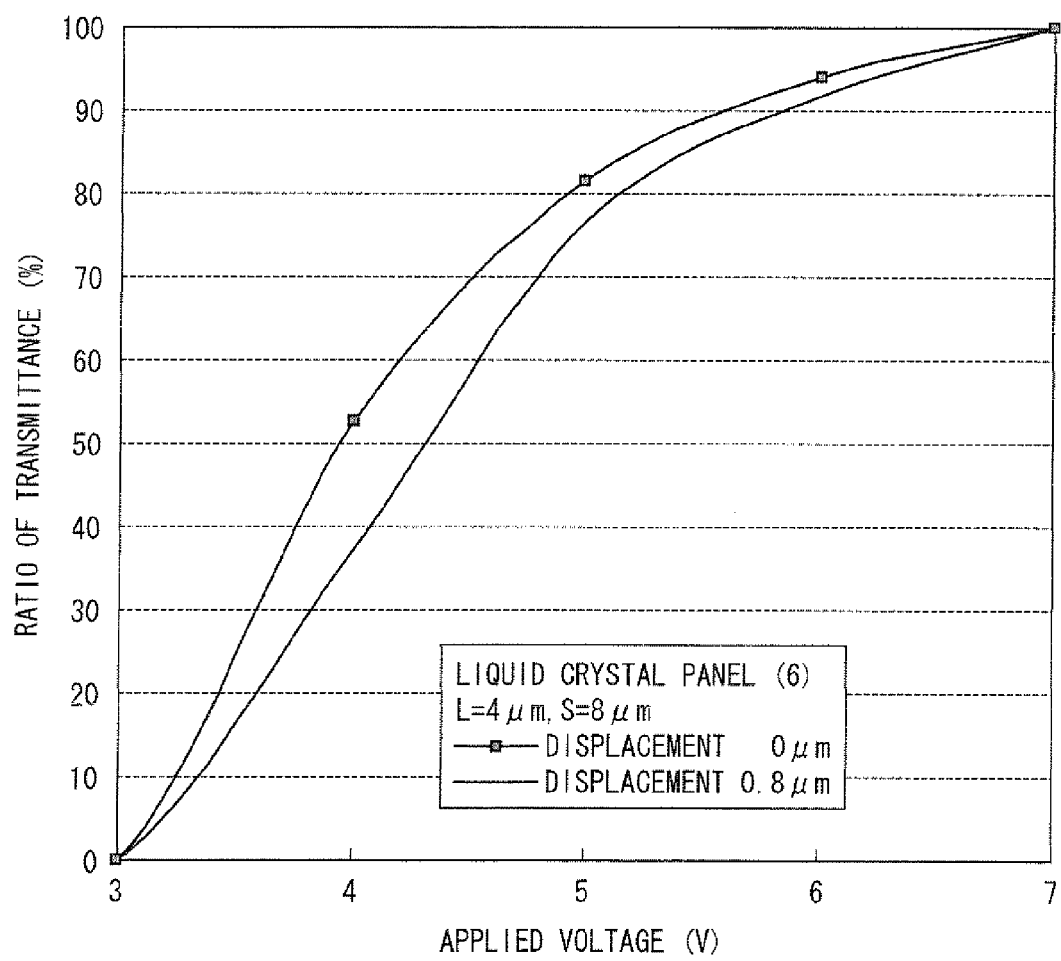
FIG. 11 is a graph showing a relationship between the voltage applied and the ratio of transmittance by pressure as observed when L=4 μm and S=8 μm in a liquid crystal panel of FIG. 1.

Further, FIG. 11 shows the results obtained by setting as 100% the value of transmittance calculated by this simulation when a voltage of 7 V was applied to the liquid crystal panel (6) and plotting voltage-transmittance changes by luminance ratio at displacements of 0 μm and 0.8 μm. Table 3 shows the maximum variation width of transmittance as calculated by the simulation, the value of S/(L+S), and the visual evaluation result.

TABLE 3

| | | LC panel (1) | | LC panel (2) | | LC panel (3) | | LC panel (4) | | LC panel (5) | | LC panel (6) | | Comp. Ex. 2 | |
|---|---|---|---|---|---|---|---|---|---|---|---|---|---|---|---|
| | L/S | 4 μm/4 μm | | 4 μm/5 μm | | 4 μm/6 μm | | 4 μm/7 μm | | 4 μm/2 μm | | 4 μm/8 μm | | MVA | |
| Voltage | Voltage | *1 | *2 | *1 | *2 | *1 | *2 | *1 | *2 | *1 | *2 | *1 | *2 | *1 | *2 |
| V- | 0 V | 0% | 0% | 0% | 0% | 0% | 0% | 0% | 0% | 0% | 0% | 0% | 0% | 0% | 0% |
| transmittance | 1 V | 0% | 0% | 0% | 0% | 0% | 0% | 0% | 0% | 0% | 0% | 0% | 0% | 0% | 0% |
| % | 2 V | 0% | 0% | 0% | 0% | 0% | 0% | 0% | 0% | 5% | 5% | 0% | 0% | 0% | 0% |

TABLE 3-continued

| | LC panel (1) | | LC panel (2) | | LC panel (3) | | LC panel (4) | | LC panel (5) | | LC panel (6) | | Comp. Ex. 2 | |
|---|---|---|---|---|---|---|---|---|---|---|---|---|---|---|
| 3 V | 34% | 32% | 27% | 22% | 3% | 2% | 0% | 0% | 36% | 35% | 0% | 0% | 43% | 36% |
| 4 V | 69% | 66% | 67% | 63% | 65% | 59% | 59% | 50% | 66% | 64% | 53% | 37% | 82% | 74% |
| 5 V | 87% | 84% | 86% | 84% | 86% | 82% | 83% | 79% | 84% | 82% | 81% | 77% | 94% | 89% |
| 6 V | 95% | 94% | 95% | 94% | 95% | 93% | 94% | 92% | 94% | 93% | 94% | 92% | 98% | 96% |
| 7 V | 100% | 100% | 100% | 100% | 100% | 100% | 100% | 100% | 100% | 100% | 100% | 100% | 100% | 100% |
| S/(L + S) | 0.50 | | 0.56 | | 0.60 | | 0.64 | | 0.33 | | 0.67 | | — | |
| Maximum variation width | 3% | | 3.5% | | 4.7% | | 8.0% | | 2.0% | | 15.0% | | 9.0% | |
| Visual evaluation | Very good | | Very good | | Very good | | Good | | NA | | Poor | | Poor | |

*1: Transmittance as obtained when the displacement was 0 μm
*2: Transmittance as obtained when the displacement was 0.8 μm Further, the changes in transmittance as obtained by the simulations were confirmed by actual measurement. In the actual measurement, the liquid crystal panel 2, represented by the liquid crystal panel (1), which had an electrode width L of 4 μm and an electrode interval S of 4 μm, the liquid crystal panel 2, represented by the liquid crystal panel (3), which had an electrode width L of 4 μm and an electrode interval S of 6 μm, the liquid crystal panel 2, represented by the liquid crystal panel (6), which had an electrode width L of 4 μm and an electrode interval S of 8 μm, and the liquid crystal panel 102 of the MVA mode fabricated in the comparative example were used.

The actual measurement was carried out by: measuring the amount of displacement of the substrate 20 or 120 while controlling pressure force on each liquid crystal panel 2 or 102 by pressing its surface with a touch pen; and then confirming a voltage-transmittance change at the front of each liquid crystal panel 2 with use of a luminance meter "BM5A" (manufactured by Topco, Co., Ltd.). The actual measurement results closely matched the simulation results.

According to the measurement results, as shown in Table 3 and FIGS. 6 through 11, when the electrode interval S is variously varied with an invariable electrode width L, it reveals that a longer electrode interval S results in a greater width of variation in transmittance due to pressure and a shorter electrode interval S results in a narrower width of variation in transmittance due to pressure.

Further, from the results shown in Table 3, FIGS. 6 through 11, and FIG. 22, it was confirmed that, if the electrode interval is 7 μm or shorter, as compared with the liquid crystal panel 102 of the MVA mode, the transmittance of the liquid crystal panels will seldom vary and is independent of cell thickness, regardless of the voltage applied. Meanwhile, it was found that, once the electrode interval is 8 μm, the transmittance of the liquid crystal panels will vary as much as that of the liquid crystal panel 102 of the MVA mode.

Next, because a difference in luminance will be reduced by placing the electrodes at shorter intervals S, as described above, the "LCD-Master 2F" was used to confirm a relationship between the voltage applied and the transmittance (transmittance curve) as observed when the amount of displacement of the substrate 20 is 0.8 μm in each of the liquid crystal panels (5), (1), (3), and (6). These results are shown in FIGS. 12 through 15.

Figure 12:
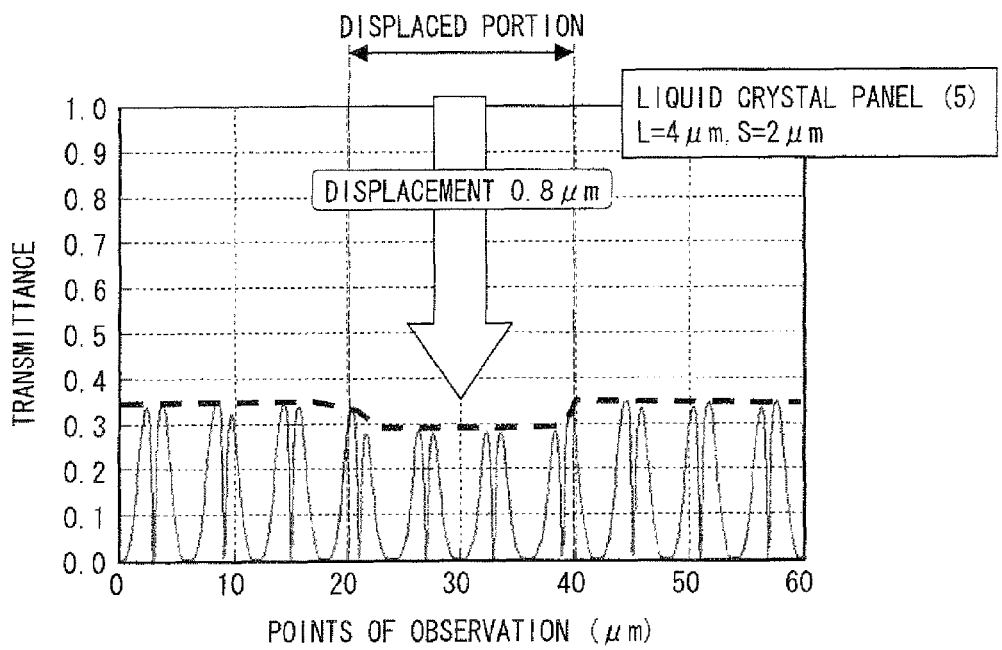
FIG. 12 is a graph showing a relationship between the voltage applied and the ratio of transmittance by pressure in the liquid crystal panel (5).
Figure 13:
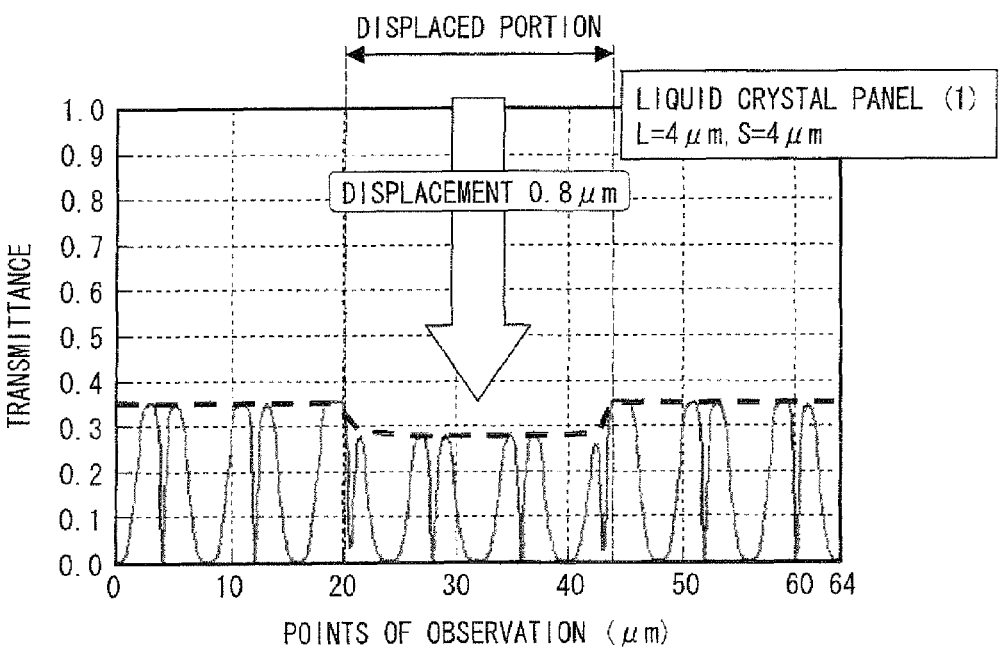
FIG. 13 is a graph showing a relationship between the voltage applied and the ratio of transmittance by pressure in the liquid crystal panel (1).
Figure 14:
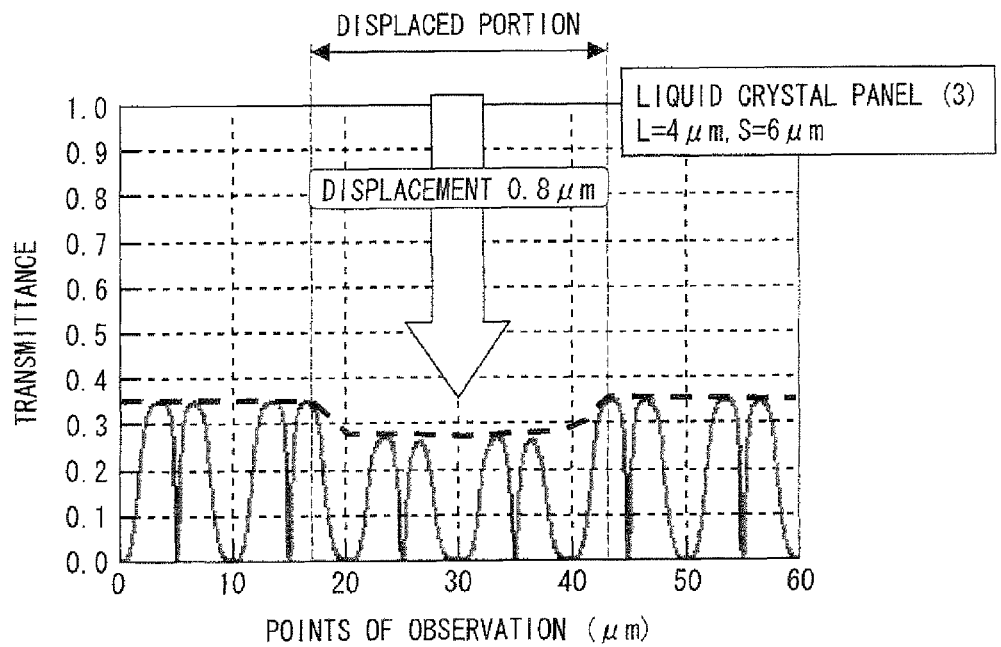
FIG. 14 is a graph showing a relationship between the voltage applied and the ratio of transmittance by pressure in the liquid crystal panel (3).
Figure 15:
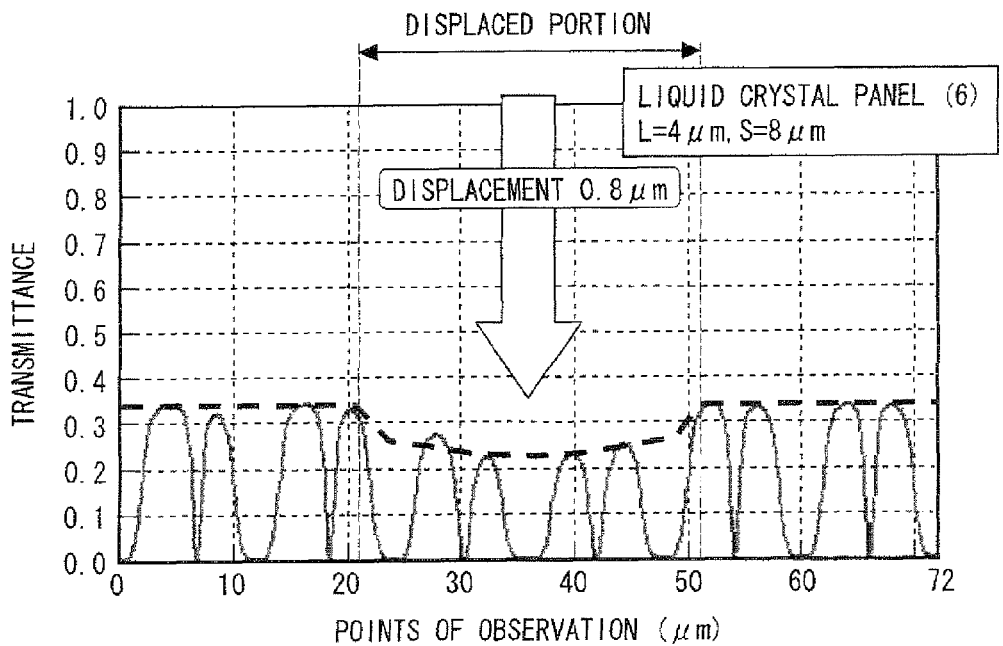
FIG. 15 is a graph showing a relationship between the voltage applied and the ratio of transmittance by pressure in the liquid crystal panel (6).

FIG. 12 is a graph showing a relationship between the voltage applied and the ratio of transmittance by pressure in the liquid crystal panel (5), and FIG. 13 is a graph showing a relationship between the voltage applied and the ratio of transmittance by pressure in the liquid crystal panel (1). Further, FIG. 14 is a graph showing a relationship between the voltage applied and the ratio of transmittance by pressure in the liquid crystal panel (3), and FIG. 15 is a graph showing a relationship between the voltage applied and the ratio of transmittance by pressure in the liquid crystal panel (6).

From FIGS. 12 through 15, it is confirmed that an increase in electrode interval S results in an increase in amount of change in transmittance. Especially when the electrode width L is 4 μm and the electrode interval S is 2 μm, 4 μm, or 6 μm, the liquid crystal panel 2 varies much less in transmittance in response to displacement of the substrate 20 than the liquid crystal panel 102 of the MVA mode shown in FIG. 21.

Therefore, the results shown in FIGS. 12 through 15 also show that a change in transmittance can be suppressed by reducing the electrode interval S.

On the other hand, however, the tilt of liquid crystal molecules 31 above the combtooth electrodes 12 and 13 in the liquid crystal panel 2 is so small that light is not transmitted. For this reason, it is conceivable that an increase in electrode width L by a decrease in electrode interval S may cause the liquid crystal panel 2 to become lower in transmittance as a whole.

In laying out the electrodes, a relationship between the value of A, which is calculated according to the relational expression between the electrode width L and the electrode interval S, expressed as A=S/(S+L), and the amount of change in luminance ratio (i.e., the variation width of luminance, indicated by the maximum variation width of transmittance) as obtained when the amount of displacement of the substrate 20 is 0.8 μm was plotted. The resulting plot was compared with that obtained from the liquid crystal panel 102 of the MVA mode. The comparison result is shown in FIG. 16.

As shown in Table 3, the maximum variation width of transmittance in the liquid crystal panel 102 of the MVA mode is 9.0% (indicated by the dotted line in FIG. 16). Therefore, it is understood from FIG. 16 that the liquid crystal panel 2 is smaller in amount of change in luminance ratio than the liquid crystal panel 102 of the MVA mode, which is the comparative example, that an effective range of values of A (=S/(S+L)) is S/(S+L)≦0.64, and that a range of S/(S+L) further effective in suppressing a change in luminance ratio and suppressing display unevenness is S/(S+L)≦0.6.

Further, in the vertical-alignment transverse-electric-field mode described above, the space part between the combtooth electrodes 12 and 13 as indicated by the electrode interval S is identical with a transmission opening. For this reason, when the electrode interval S becomes too short, the maximum transmittance decreases.

Therefore, although the most recent photo process has such a problem that the shortest electrode interval S possible is 2 μm, it is conceivable, for the reason stated above, that there is a point of inflection of transmittance within a range where the electrode interval S is shorter than 2 μm.

This is supported, as shown in Table 4 and FIG. 17, by a relationship between the transmittance as obtained when a voltage of 7 V is applied to each of the liquid crystal panels (1) to (6) and the electrode interval S.

TABLE 4

| Electrode interval S | Transmittance (7 V) |
|---|---|
| 2 μm | 18.2% |
| 4 μm | 21.0% |
| 5 μm | 21.9% |
| 6 μm | 23.0% |
| 7 μm | 23.2% |
| 8 μm | 24.0% |

In consideration of the results shown in Table 4 and FIG. 17 and the problem stated above, it is preferable that the electrode interval S be 2 μm or longer. Therefore, from Table 3 and FIG. 16, it is preferable that the value of A fall within a range $0.33 \leq S/(S+L) \leq 0.64$, or more preferably within a range $0.33 \leq S/(S+L) \leq 0.6$.

Next, a preferred range of rates of occupation by dead zones is verified.

As stated above, the rate of occupation by dead zones is the proportion of dead zones (i.e., portions whose respective tone-luminance ratios are 20% or lower) to the total number of places into which a unit region has been divided equally along an X axis, obtained by normalizing the respective luminances of the places into which the unit region has been divided equally along the X axis. In the case of actual measurement, the rate of occupation by dead zones can be computed by calculating the proportion by processing an optical microscope image as described above.

First, the result obtained by actually measuring the rate of occupation by dead zone in the region A-A' of FIG. 3 is compared below with the results computed by means of simulations. Table 5 shows a relationship between the electrode interval S and the rate of occupation by dead zones as computed by means of simulations. The simulations were run by "LCD-Master 2F".

TABLE 5

| Electrode interval S | Rate of occupation by dead zones |
|---|---|
| 2 μm | 35.0% |
| 4 μm | 28.8% |
| 5 μm | 26.1% |
| 6 μm | 25.5% |
| 7 μm | 24.1% |
| 8 μm | 22.9% |

The actual measurement results shown in Tables 1 and 2 show that when the electrode interval S is 7.5 μm, the proportion (number) of dead zones among the places into which the unit region A-A' of FIG. 3 has been divided along the X axis is 41. As shown in Tables 1 and 2, the total number of places into which the unit region A-A' of FIG. 3 has been divided along the X axis is 175; therefore, the rate of occupation by dead zones is 23.4%.

Meanwhile, when the electrode interval S is 7.5 μm, the rate of occupation by dead zones as calculated by interpolating the results shown in Table 5 by means of a simulation is 23.5%, which matches the actual measurement.

Based on this simulation result, a relationship between the rate of occupation by dead zones and the amount of change in luminance ratio (i.e., the variation width of luminance, indicated by the maximum variation width of transmittance) as obtained when the amount of displacement of the substrate 20 is 0.8 μm was plotted. The resulting plot was compared with that obtained from the liquid crystal panel 102 of the MVA mode. The comparison result is shown in FIG. 18.

Figure 18:
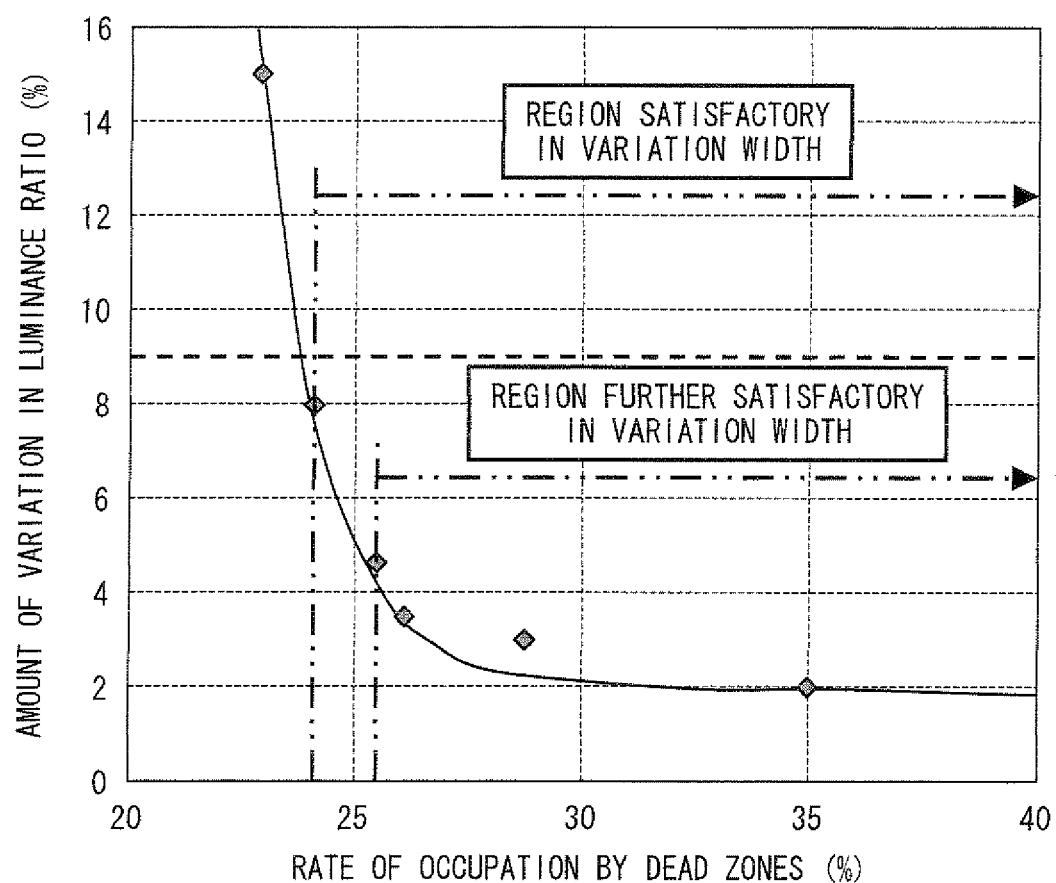
FIG. 18 is a graph showing a relationship between the rate of occupation by dead zones and the amount of change in luminance ratio as obtained when the amount of displacement of a substrate is 0.8 µm.

As stated above, the maximum variation width of transmittance in the liquid crystal panel 102 of the MVA mode is 9.0% (indicated by the dotted line in FIG. 18). Therefore, it is understood from FIG. 18 that the liquid crystal panel 2 is smaller in amount of change in luminance ratio than the liquid crystal panel 102 of the MVA mode, which is the comparative example, that an effective rate of occupation by dead zones is 24% or higher, and that a rate of occupation by dead zones further effective in suppressing a change in luminance ratio and suppressing display unevenness is 25% or higher.

Further, as stated above, in the vertical-alignment transverse-electric-field mode, the space part between the comb-tooth electrodes 12 and 13 as indicated by the electrode interval S is identical with a transmission opening. For the reason stated above, it is preferable that the electrode interval S be 2 μm or longer.

Figure 19:
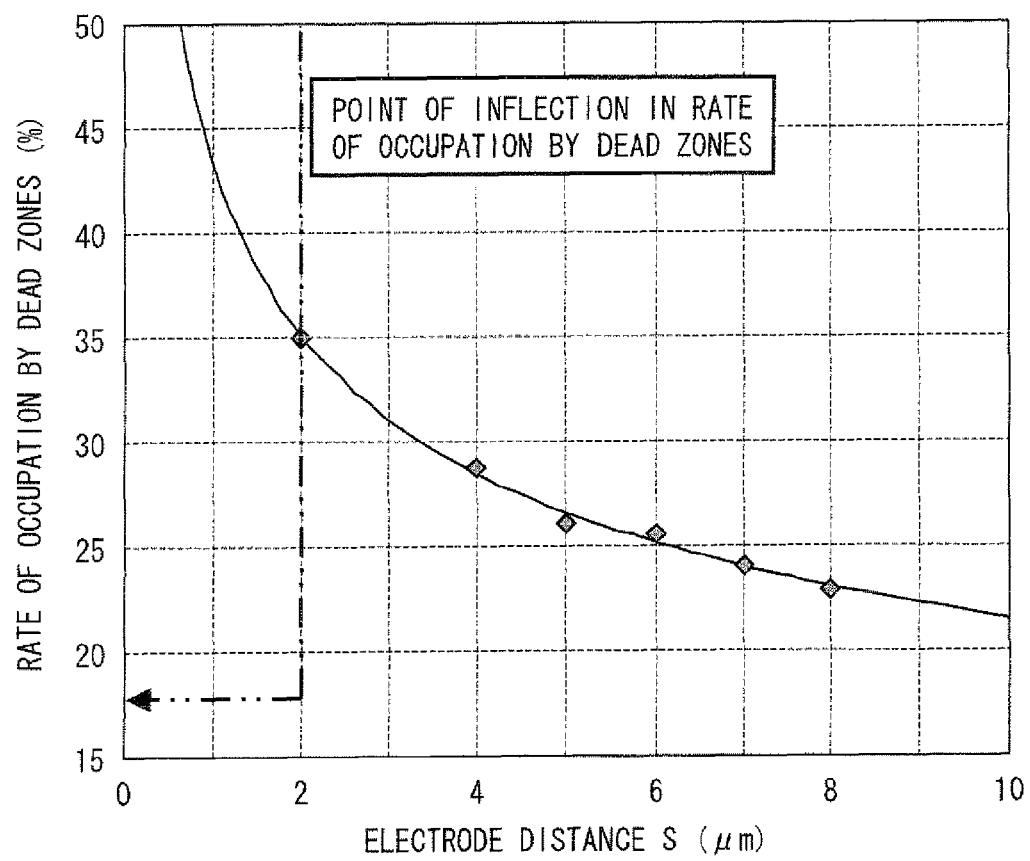
FIG. 19 is a graph showing a relationship between the rate of occupation by dead zones and the electrode interval S.

FIG. 19 shows a relationship between the rate of occupation by dead zones and the electrode interval S. When the electrode interval S is 2 μm, the rate of occupation by dead zones is 35%, as shown in Table 5 and FIG. 19. Further, it is understood, from the result shown in FIG. 19, that the rate of occupation by dead zones has a point of inflection at an electrode interval S of approximately 2 μm. Therefore, it is preferable that the rate of occupation by dead zones fall within a range of 24% or higher to 35% or lower, or more preferably 25% or higher to 35% or lower.

From these results, it is understood that according to the present invention, the satisfaction of the relational expression "$0.33 \leq S/(S+L) \leq 0.64$" or "24% ≦ rate of occupation by dead zones ≦ 35%" by a vertical-alignment liquid crystal panel 2 that is driven by a transverse electric field makes it possible to render curves of distribution of transmittance along a direction parallel to surfaces of the substrates smaller to suppress a difference in transmittance between a portion with cell thickness variation and a portion without cell thickness variation, thus making it possible to remedy pressure unevenness caused by cell thickness variation.

As described above, according to the present invention, a change in transmittance along with cell thickness variation due to distortion (undulation) of a substrate can be suppressed by setting the electrode width L and the electrode interval S so that the transmittance is averaged out.

Further, according to the present invention, since a change in transmittance along with cell thickness variation due to distortion (undulation) of a substrate can be suppressed as described above, it is possible to suppress a change in transmittance along with cell thickness variation due to distortion (undulation) of the substrate per se, as well as distortion (undulation) of the substrate by pressure.

This makes it possible, for example, to use as the glass substrate 21 an unpolished glass having an undulating surface. This makes it possible to shorten a process for fabrication, thus making it possible to reduce cost of fabrication.

Further, according to the present invention, as described above, by driving the vertical alignment liquid crystal panel 2 by a transverse electric field, a display can be carried out by rotating the liquid crystal molecules 31 by the transverse electric field to control the amount of light that is transmitted by the liquid crystal panel 2, while keeping the high-contrast characteristic of vertical alignment. For this reason, the liquid crystal panel 2 has high contrast and an excellent viewing angle characteristic. Further, in the liquid crystal panel 2, as in the OCB mode, when the liquid crystal molecules 31 start moving, the flow of the liquid crystal molecules 31 acts in such a direction as to assist the movement of the liquid crystal molecules 31. For this reason, the liquid crystal panel 2 also has the advantage of being capable of high-speed response.

Therefore, the present invention makes it possible to provide: a liquid crystal panel which has a high-contrast characteristic and a wide viewing angle characteristic, which is capable of high-speed response, and which can remedy display unevenness such as pressure unevenness caused by cell thickness variation due to distortion (undulation) of a substrate such as a glass substrate; and a liquid crystal display device including such a liquid crystal panel.

Figure 20:
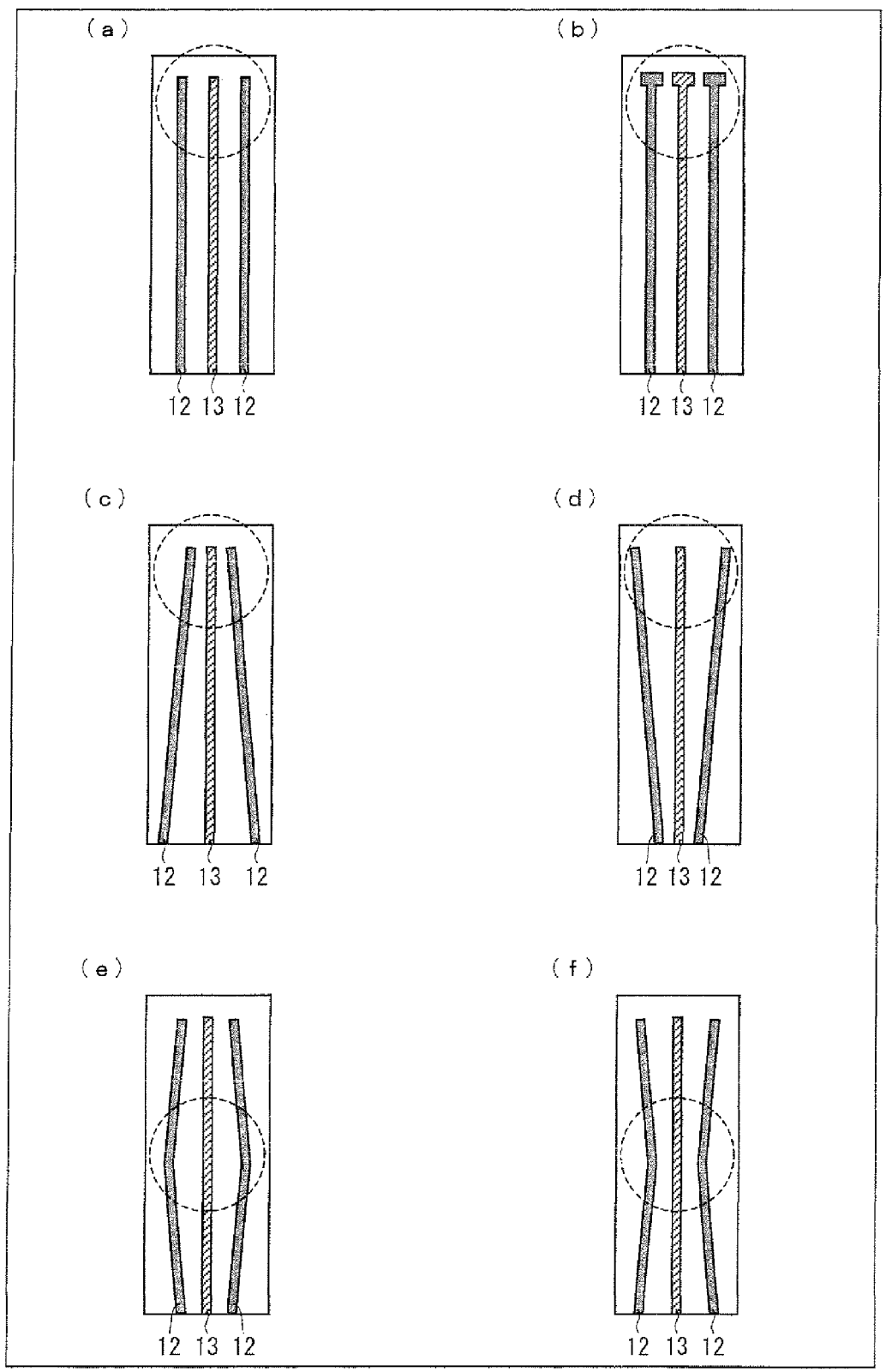
FIG. 20 includes plan views (a) through (f) each showing example shapes of combtooth electrodes in a liquid crystal panel of FIG. 1.

In the present embodiment, the combtooth electrodes 12 and 13 may be linearly shaped as shown in (a) of FIG. 20, or may be hammer-shaped at their edges as encircled by the dotted line in (b) of FIG. 20. Although not illustrated, their edges may be acute-angled, e.g., tapered. That is, the combtooth electrodes 12 and 13 may be different partially in electrode width L from each other.

Further, as encircled by the dotted line in (c) of FIG. 20, each of the combtooth electrodes 12 and the combtooth electrode 13 may be in a truncated chevron shape. Specifically, the combtooth electrodes 12 (common electrodes) are provided in such a way as to be tilted to the combtooth electrode 13 (pixel electrode), whereby the electrode interval S between each combtooth electrode 12 and its adjacent combtooth electrode 13 becomes larger toward their edges. Alternatively, as encircled by the dotted line in (d) of FIG. 20, each of the combtooth electrodes 12 and the combtooth electrode 13 may be in an inverted truncated chevron shape. Specifically, the electrode interval S between each combtooth electrode 12 and its adjacent combtooth electrode 13 may become smaller toward their edges. That is, the combtooth electrodes 12 and 13 do not necessarily need to be placed at a constant electrode interval S.

Further, as encircled by the dotted lines in (e) and (f) of FIG. 20, a set of each of the combtooth electrodes 12 and the combtooth electrode 13 may have bend sections so that the electrode interval S between each combtooth electrode 12 and its adjacent combtooth electrode 13 either gradually increases and then gradually decreases or gradually decreases and then gradually increases. That is, the combtooth electrodes 12 and 13 may be V-shaped or zigzagged.

Further, although not illustrated, the combtooth electrodes 12 and 13 may be different in electrode width L from each other. Further, the combtooth electrodes 12 and 13 may be placed at different electrode intervals S. For example, the electrode intervals S may vary from one such unit region as described above to another, and there may be a combination of combtooth electrodes 12 and 13 placed at relatively wide electrode intervals S and a combination of combtooth electrodes 12 and 13 placed at relatively narrow electrode intervals S.

In this way, the shapes and arrangements of the combtooth electrodes 12 and 13 may be varied in many ways within such a range that the relational expression "$0.33 \leq S/(S+L) \leq 0.64$" or "$24\% \leq$ rate of occupation by dead zones $\leq 35\%$" is satisfied.

Although FIG. 1 shows an example where the combtooth electrodes 12 and 13 are provided in the substrate 10, the present embodiment is not limited to this example. The combtooth electrodes 12 and 13 only need to be provided in at least one of the substrates 10 and 20.

Further, although FIG. 2 shows an example where the liquid crystal panel 2 of the liquid crystal display device 1 has the touch panel 41 placed thereon as a coordinate input device, the present invention is not limited to this example.

For example, instead of having the touch panel 41 placed thereon, the liquid crystal panel 2 per se may have a coordinate input function.

That is, the liquid crystal panel 2 and the liquid crystal display device 1 may have an coordinate sensor (light sensor) or the like in the liquid crystal panel 2, and may be a liquid crystal panel or liquid crystal display device having a coordinate input function, such as a touch-panel-integrated liquid crystal panel or a touch-panel-integrated liquid crystal display device.

As described above, a liquid crystal panel according to the present invention includes: a pair of substrates; and a liquid crystal layer sandwiched between the substrates, at least one of the substrates being provided with a first electrode and a second electrode, the liquid crystal layer being driven by a transverse electric field generated between the first and second electrodes, the liquid crystal layer containing liquid crystal molecules that align themselves perpendicularly to surfaces of the substrates when no electric field is applied, the liquid crystal panel satisfying $0.33 \leq S/(S+L) \leq 0.64$, where L is the width of each of the first and second electrodes and S is the interval between the first and second electrodes.

The liquid crystal panel is preferably configured such that $S/(S+L)$ satisfies $0.33 \leq S/(S+L) \leq 0.6$.

Further, a liquid crystal panel according to the present invention includes: a pair of substrates; and a liquid crystal layer sandwiched between the substrates, at least one of the substrates being provided with a first electrode and a second electrode, the liquid crystal layer being driven by a transverse electric field generated between the first and second electrodes, the liquid crystal layer containing liquid crystal molecules that align themselves perpendicularly to surfaces of the substrates when no electric field is applied, the liquid crystal panel having a rate of occupation by dead zones of 24% or higher and 35% or lower, the rate of occupation by dead zones being the proportion of portions whose respective tone-luminance ratios are 20% or lower to the total number of places into which a unit region has been divided equally along an X axis, obtained by normalizing the respective luminances of the places into which the unit region has been divided equally along the X axis.

The liquid crystal panel is preferably configured such that the rate of occupation by dead zones is 25% or higher and 35% or lower.

Each of the foregoing configurations can render curves of distribution of transmittance along a direction parallel to surfaces of the substrates smaller to suppress a difference in transmittance between a portion with cell thickness variation and a portion without cell thickness variation. For this reason, pressure unevenness caused by cell thickness variation can be better remedied than ever before.

Further, especially when $S/(S+L)$ satisfies $0.33 \leq S/(S+L) \leq 0.6$ or the rate of occupation by dead zones is 25% or higher and 35% or lower, the effect of suppressing a change in transmittance is remarkably improved. For this reason, in this case, the effect of suppressing pressure unevenness caused by cell thickness variation can be further improved.

Further, the liquid crystal panel is preferably a touch-panel-integrated liquid crystal panel.

Since the liquid crystal panel can suppress pressure unevenness caused by cell thickness variation due to distortion (undulation) of a substrate as described above, the liquid crystal panel can be suitable used as a touch-panel-integrated liquid crystal panel having a coordinate input function.

Further, a liquid crystal display device including such a liquid crystal panel can better remedy pressure unevenness caused by cell thickness variation than ever before.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

A liquid crystal panel according to the present invention and a liquid crystal panel including such a liquid crystal panel can remedy pressure unevenness caused by cell thickness variation due to distortion (undulation) of a substrate such as a glass substrate and, as such can be suitably used for banking terminals such as ATMs, personal computers, remote controllers, various monitors, electronic organizers, PDAs, and cellular phones.

REFERENCE SIGNS LIST

1 Liquid crystal display device
2 Liquid crystal panel
3 Driving circuit
4 Backlight
5 Liquid crystal cell
10 Substrate
11 Glass substrate
12 Combtooth electrode (first electrode)
13 Combtooth electrode (second electrode)
14 Alignment film
20 Substrate
21 Glass substrate
22 Color filter
23 Black matrix
24 Planarizing film
25 Columnar spacer
26 Alignment film
30 Liquid crystal layer
31 Liquid crystal molecule
35 Polarizing plate
36 Polarizing plate
37 Wave plate
38 Wave plate
41 Touch panel

The invention claimed is:

1. A liquid crystal panel comprising:
a pair of substrates; and
a liquid crystal layer sandwiched between the substrates,
at least one of the substrates being provided with a first electrode and a second electrode, the liquid crystal layer being driven by a transverse electric field generated between the first and second electrodes,
the liquid crystal layer containing liquid crystal molecules that align themselves perpendicularly to surfaces of the substrates when no electric field is applied,
said liquid crystal panel satisfying $0.33 \leq S/(S+L) \leq 0.64$, where L is the width of each of the first and second electrodes and S is the interval between the first and second electrodes.

2. The liquid crystal panel as set forth in claim 1, wherein $S/(S+L)$ satisfies $0.33 \leq S/(S+L) \leq 0.6$.

3. A liquid crystal panel comprising:
a pair of substrates; and
a liquid crystal layer sandwiched between the substrates,
at least one of the substrates being provided with a first electrode and a second electrode, the liquid crystal layer being driven by a transverse electric field generated between the first and second electrodes,
the liquid crystal layer containing liquid crystal molecules that align themselves perpendicularly to surfaces of the substrates when no electric field is applied,
said liquid crystal panel having a rate of occupation by dead zones of 24% or higher and 35% or lower, the rate of occupation by dead zones being the proportion of portions whose respective tone-luminance ratios are 20% or lower to the total number of places into which a unit region has been divided equally along an X axis, obtained by normalizing the respective luminances of the places into which the unit region has been divided equally along the X axis.

4. The liquid crystal panel as set forth in claim 3, wherein the rate of occupation by dead zones is 25% or higher and 35% or lower.

5. The liquid crystal panel as set forth in claim 1, said liquid crystal panel being a touch-panel-integrated liquid crystal panel.

6. A liquid crystal device comprising a liquid crystal panel as set forth in claim 1.

7. The liquid crystal panel as set forth in claim 3, said liquid crystal panel being a touch-panel-integrated liquid crystal panel.

8. A liquid crystal device comprising a liquid crystal panel as set forth in claim 3.

* * * * *